(12) United States Patent
Weiss et al.

(10) Patent No.: US 7,808,655 B2
(45) Date of Patent: Oct. 5, 2010

(54) AUTOMATED SYSTEM FOR DETERMINING PHYSICAL CHARACTERISTICS OF A SHAFT

(75) Inventors: Richard M. Weiss, Tequesta, FL (US); Joseph H. Butler, Knoxville, TN (US); Brian E. Townsend, Knoxville, TN (US); David B. Nichols, Knoxville, TN (US)

(73) Assignee: The Richard M. Weiss Revocable Trust, Tequesta, FL (US)

( * ) Notice: Subject to any disclaimer, the term of this patent is extended or adjusted under 35 U.S.C. 154(b) by 154 days.

(21) Appl. No.: 12/247,535

(22) Filed: Oct. 8, 2008

(65) Prior Publication Data

US 2010/0088043 A1   Apr. 8, 2010

(51) Int. Cl.
*G01B 11/24* (2006.01)
(52) U.S. Cl. .................................. 356/601; 356/614
(58) Field of Classification Search .................. 356/601, 356/614, 615
See application file for complete search history.

(56) References Cited

U.S. PATENT DOCUMENTS

| | | | |
|---|---|---|---|
| 4,070,022 A | 1/1978 | Braly | |
| 5,040,279 A | 8/1991 | Braly | |
| 5,419,192 A | 5/1995 | Maxwell et al. | |
| 5,429,008 A | 7/1995 | Matsumoto et al. | |
| 5,515,717 A | 5/1996 | White | |
| 5,976,028 A | 11/1999 | Ciccarello et al. | |
| 6,183,375 B1 | 2/2001 | Weiss | |
| 6,405,595 B1 | 6/2002 | Harrison | |
| 6,526,613 B1 | 3/2003 | Penley | |
| 6,571,640 B2 | 6/2003 | Harrison | |
| 6,572,488 B1 | 6/2003 | Weiss et al. | |
| 6,915,695 B2 * | 7/2005 | Weiss et al. | 73/579 |
| 6,968,747 B2 | 11/2005 | Chen | |
| 6,990,865 B2 * | 1/2006 | Weiss et al. | 73/579 |
| 6,993,970 B2 * | 2/2006 | Weiss et al. | 73/579 |
| 6,997,056 B2 | 2/2006 | Weiss et al. | |
| 7,066,025 B1 | 6/2006 | Corbin | |
| 7,415,867 B2 * | 8/2008 | Spencer et al. | 73/65.03 |
| 2003/0013541 A1 * | 1/2003 | Weiss et al. | 473/316 |
| 2005/0217379 A1 * | 10/2005 | Weiss et al. | 73/579 |
| 2005/0223802 A1 * | 10/2005 | Weiss et al. | 73/579 |

FOREIGN PATENT DOCUMENTS

| | | |
|---|---|---|
| JP | 01-121829 U | 8/1989 |
| JP | 05118952 | 5/1993 |
| JP | 07-021436 | 3/1995 |
| JP | 11178952 | 7/1999 |
| JP | 2000-097796 | 4/2000 |

OTHER PUBLICATIONS

Add Examiner Signature.

* cited by examiner

*Primary Examiner*—Roy Punnoose
(74) *Attorney, Agent, or Firm*—Graham Curtin, PA

(57) ABSTRACT

A computer-controlled system automatically measures and records various physical characteristics of an elongated shaft or tube, such as a golf club shaft or other structural member. The characteristics measured include the principal planar oscillation plane, oscillation frequency, stiffness asymmetry, relative stiffness, torsional stiffness, shaft length, shaft straightness and tip angle.

38 Claims, 22 Drawing Sheets

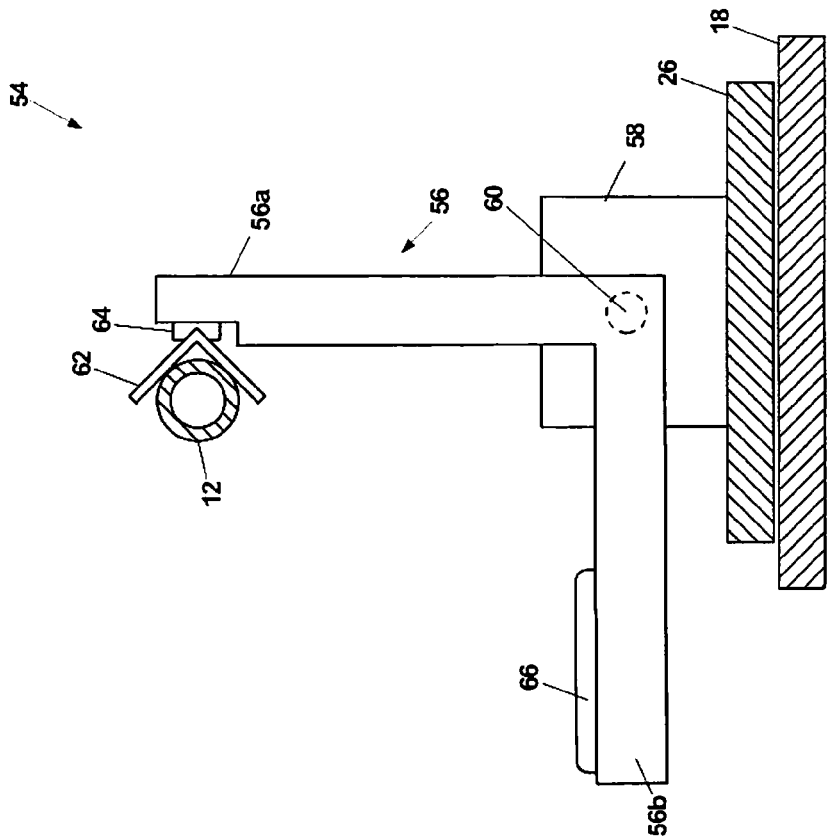
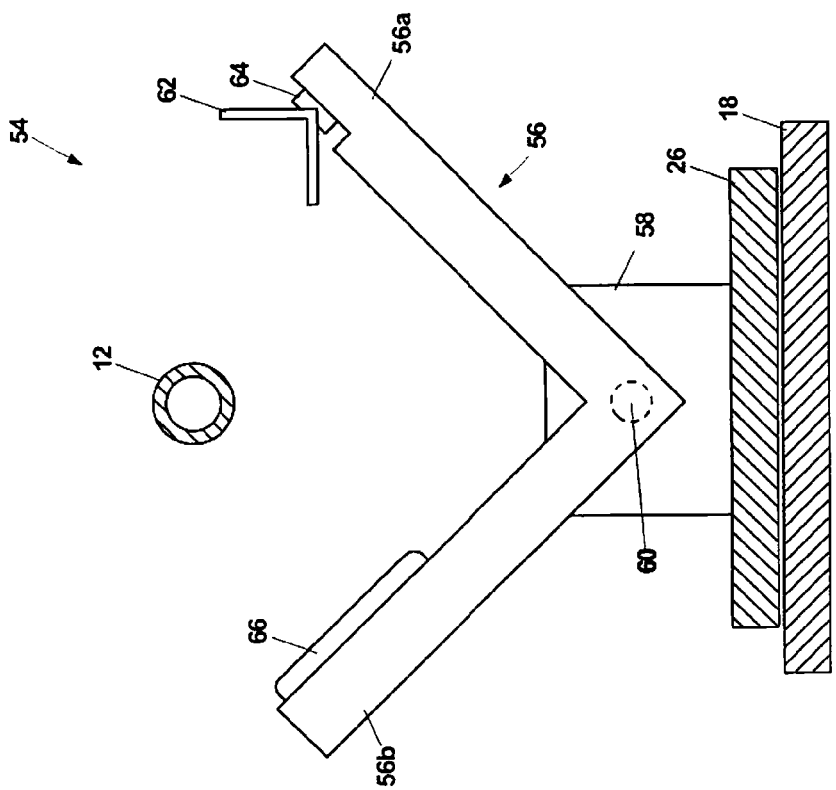
FIG. 12A (Section A-A)
FIG. 12B (Section B-B)

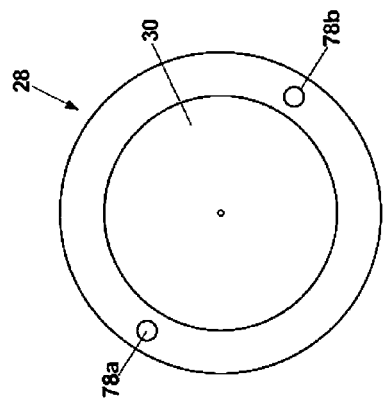
FIG. 13
*(View D-D)*
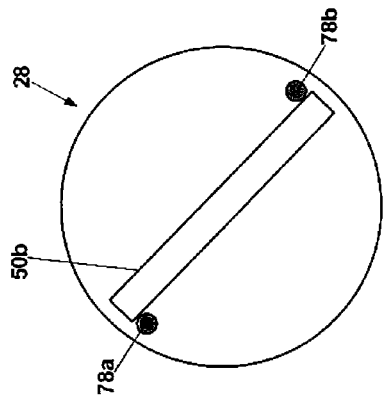
FIG. 14
*(Section E-E)*
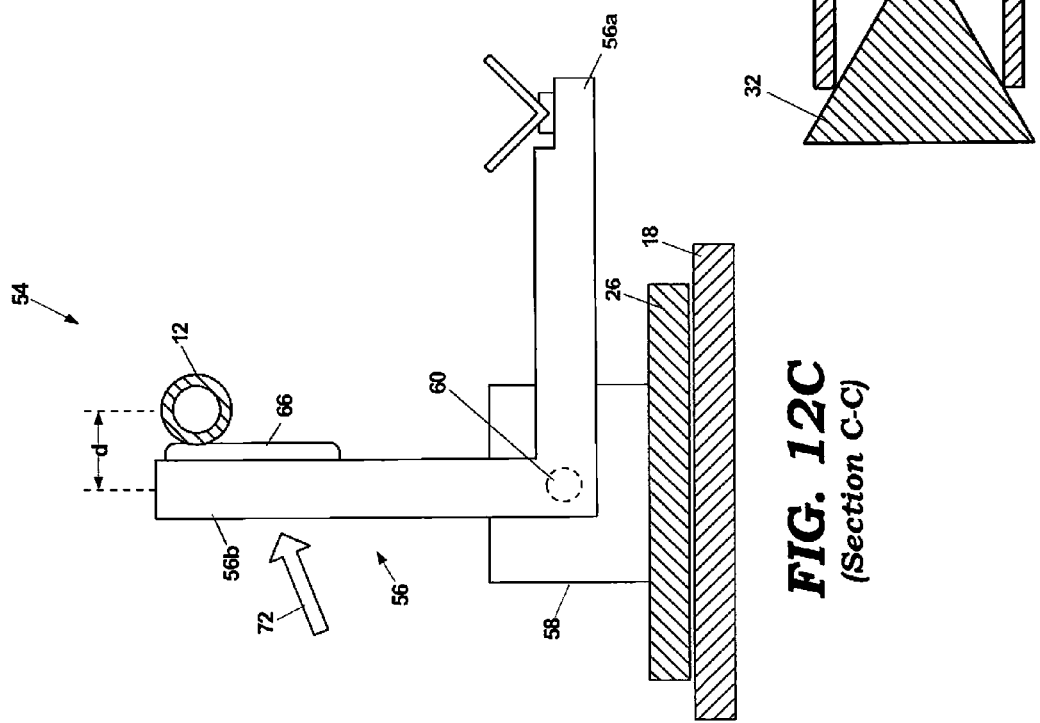
FIG. 15
FIG. 12C
*(Section C-C)*

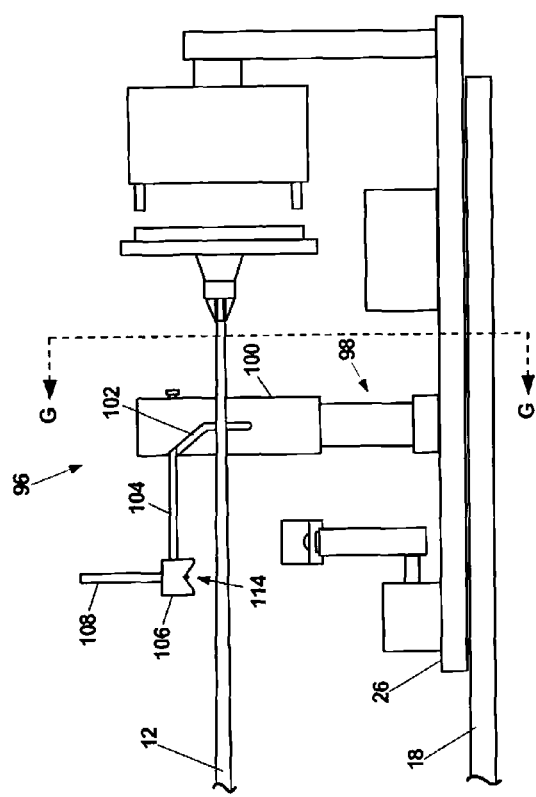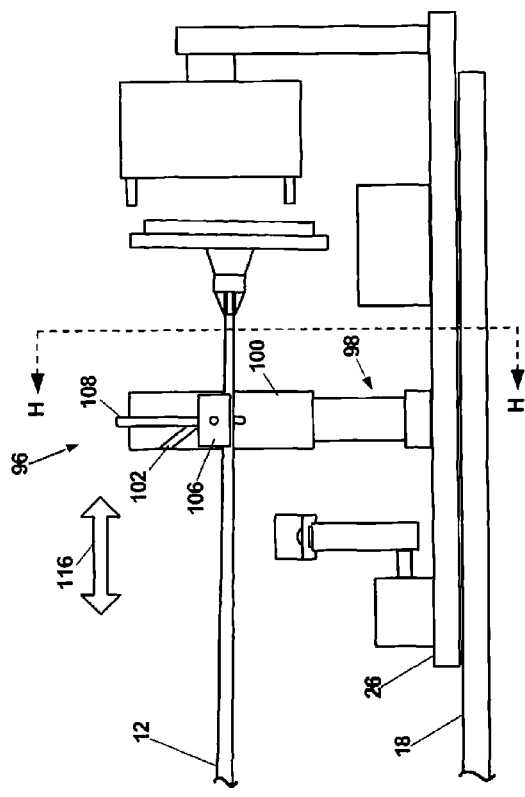

*(Section G-G)*

*(Section H-H)*

AUTOMATED SYSTEM FOR DETERMINING PHYSICAL CHARACTERISTICS OF A SHAFT

FIELD

This invention relates to measurement of physical characteristics of an elongated tubular structure. More particularly, this invention relates to a system for measuring physical characteristics of an elongated shaft, such as a golf club shaft, a fishing pole, a pool cue, an archery arrow, a javelin, a baseball bat or other structural member.

BACKGROUND

As described in prior patents, including U.S. Pat. Nos. 6,183,375, 6,572,488 and 6,997,056 issued to Weiss et al., the golfing industry has recognized that substantially all golf club shafts exhibit some degree of asymmetry in their physical characteristics. The industry has also generally recognized that substantially every golf club shaft exhibits at least one orientation in which, when the shaft is clamped at its grip end and displaced at the tip end, the resultant vibration of the shaft remains substantially planar. That is, the oscillation of the shaft remains substantially in a single plane, with the tip of the shaft vibrating back and forth substantially along a line. Although a shaft may exhibit nearly planar oscillation at more than one axial rotation position, there is typically a single axial rotation position at which the oscillation is most planar and stable. This single plane is referred to as the principal planar oscillation plane (PPOP). The patents listed above and others have thoroughly documented the benefits associated with consistently aligning the principal planar oscillation plane of golf clubs within a set of clubs.

Asymmetry in golf club shafts can result from nonsymmetrical cross sections (shafts whose cross sections are not round or whose wall thicknesses are not uniform), shafts that are not straight, or shafts whose material properties vary around the circumference of the shaft cross section. Recognizing that it is substantially impossible to build a perfectly symmetric golf club shaft, the desired objective is to minimize inconsistencies from club to club and from set to set. Thus, if possible, it is desirable to analyze each golf club shaft in a set of golf clubs to understand its asymmetric bending or twisting behavior and construct the golf clubs in the set to maximize consistency from club to club and/or from set to set.

In addition to determining the principal planar oscillation plane of a shaft, it is also desirable to determine the torsional stiffness of the shaft, asymmetries in the stiffness of the shaft about its circumference, the length of the shaft, the amount of "droop" in the tip of the shaft when the grip end is secured, the straightness of the shaft (run-out), shaft relative stiffness, and modal vibrational frequencies of the shaft. Heretofore, there has been no fast and easy way to determine with consistency these parameters of a golf club shaft that would allow manufacturers or others to predict the performance of a golf club shaft.

What is needed, therefore, is a method and apparatus for quickly, automatically, and reliably determining all of the above-listed characteristics of a golf club shaft and providing data regarding these characteristics to shaft and club manufacturers and others.

SUMMARY

The above and other needs are met by a method for measuring physical characteristics of a shaft having first and second ends and a shaft center axis extending from the first end to the second end. The shaft may be a golf club shaft wherein the first end corresponds to a grip end and the second end corresponds to a tip end. Alternatively, the first end may correspond to the tip end and the second end may correspond to the grip end. In one embodiment, the method includes the following steps:

(a) securing the first end of the shaft to prevent oscillatory movement thereof;

(b) attaching a tip mass structure to the second end of the shaft, the tip mass structure having a cylindrical reflective outer surface;

(c) imparting oscillatory motion in the shaft, thereby causing the tip mass structure to oscillate in one or more directions substantially perpendicular to the shaft center axis;

(d) illuminating the cylindrical reflective outer surface of the tip mass structure with at least two spaced apart laser beams as the tip mass structure oscillates;

(e) detecting laser energy reflected from the cylindrical reflective outer surface of the tip mass structure as the tip mass structure oscillates;

(f) generating shaft distance signals based upon the laser energy detected in step (e); and (g) based on the shaft distance signals, determining information about the oscillatory motion of the second end of the shaft.

In some embodiments, the method includes determining information indicative of a principal planar oscillation plane (PPOP) and the oscillation frequency of the second end of the shaft.

In some preferred embodiments, the method includes the additional steps of:

(h) moving a torque sensor assembly toward the tip mass structure in a direction substantially parallel to the shaft center axis;

(i) engaging the torque sensor assembly with the tip mass structure to substantially prevent rotation of the second end of the shaft;

(j) rotating the first end of the shaft through a known rotational increment; and (k) measuring torque on the second end of the shaft using the torque sensor assembly while performing step (j).

In some preferred embodiments, the step of securing the first end of the shaft includes:

inserting the first end of the shaft into a first clamping assembly containing a chuck teeth assembly or collet assembly;

resting the shaft on a cradle structure disposed between the first end and the second end of the shaft;

engaging a tip-centering structure with the second end of the shaft by moving the tip-centering structure toward the second end of the shaft;

urging the first end of the shaft against the first clamping assembly;

engaging a chuck teeth restraining device, such as a chuck key or similar device, into chuck teeth of the first clamping assembly; and rotating the first clamping assembly while engaging the chuck teeth restraining device to tighten the first clamping assembly on the first end of the shaft.

In some preferred embodiments, the method includes the additional steps of:

(h) pressing a load sensor against the shaft whereby the shaft is flexed to a bent position;

(i) rotating the shaft about the shaft center axis while performing step (h);

(j) generating a load signal using the load sensor while performing steps (h) and (i);

(k) generating a rotation angle signal while performing steps (h) and (i); and (l) determining information indicative of stiffness asymmetry of the shaft based on the load signal and rotation angle signal.

In another aspect, the invention provides an apparatus for measuring physical characteristics of a shaft having first and second ends and a shaft center axis extending from the first end to the second end. The shaft may be a golf club shaft wherein the first end corresponds to a grip end and the second end corresponds to a tip end. Alternatively, the first end may correspond to the tip end and the second end may correspond to the grip end. In a preferred embodiment, the apparatus includes a first clamping assembly for securing the first end of the shaft to prevent oscillatory movement thereof and a first computer-controlled motor for imparting rotation to the first clamping assembly, thereby causing the shaft to rotate about the shaft center axis. The apparatus includes a tip mass assembly comprising a second clamping assembly operable for attachment to the second end of the shaft, and a tip mass structure attached to the second clamping assembly. In some embodiments, multiple tip mass structures may be provided having different weights. The tip mass structure includes a cylindrical reflective outer surface having a central axis that substantially coincides with the shaft center axis when the second clamping assembly is attached to the second end of the shaft. The apparatus includes an oscillation inducement arm for pressing against the shaft to flex the shaft to a bent position, and for subsequently disengaging rapidly from the shaft to allow the second end of the shaft to spring back freely. In this manner, the oscillation inducement arm imparts an oscillatory motion in the shaft which causes the tip mass structure to oscillate in a direction substantially perpendicular to the shaft center axis. A second computer-controlled motor imparts rotation to the oscillation inducement arm to cause the oscillation inducement arm to press against and subsequently disengage from the shaft. The apparatus includes at least one laser light source for generating at least two spaced apart laser beams that illuminate the cylindrical reflective outer surface of the tip mass structure. At least two laser light detectors detect laser energy reflected from the cylindrical reflective outer surface of the tip mass structure as the tip mass structure oscillates due to motion induced by the oscillation inducement arm. Based on the detected laser energy, the laser light detectors generate shaft distance signals. A computer processor processes the shaft distance signals to determine information about the oscillatory motion of the second end of the shaft.

In a preferred embodiment, the computer processor processes the shaft distance signals to determine a principal planar oscillation plane (PPOP) and a frequency of oscillation of the second end of the shaft.

In some embodiments, the first clamping assembly includes a first chuck having first chuck teeth. In these embodiments, the apparatus includes a tip-centering structure disposed adjacent the second end of the shaft when the first end of the shaft is inserted into the first clamping assembly. The tip-centering structure is attached to a first computer-controlled slide positioning stage. The first computer-controlled slide positioning stage moves the tip-centering structure toward the first clamping assembly in a direction substantially parallel to the shaft center axis. In this way, the tip-centering structure engages the second end of the shaft to horizontally and vertically center the second end of the shaft as the shaft is urged toward the first clamping assembly. This also urges the first end of the shaft against the first clamping assembly. A chuck teeth restraining device, such as a chuck key or similar device, is attached to a second computer-controlled slide positioning stage in a position adjacent to the chuck teeth of the first chuck of the first clamping assembly. The second computer-controlled slide positioning stage is operable to move the chuck teeth restraining device toward the first clamping assembly in a direction substantially parallel to the shaft center axis, thereby engaging the chuck teeth restraining device with the chuck teeth to hold the chuck teeth stationary. The first computer-controlled motor is operable to impart rotation to the first clamping assembly, thereby causing the first chuck to tighten onto the first end of the shaft as the chuck teeth are held stationary by the chuck teeth restraining device.

In some embodiments, the apparatus includes a slide positioning stage that is operable to move the laser light source in a direction substantially parallel to the shaft center axis to a desired position at which the laser beams are incident upon the cylindrical reflective outer surface of the tip mass structure. The computer processor determines arrival at the desired position based on the laser energy reflected from the cylindrical reflective outer surface of the tip mass structure.

In some embodiments, the apparatus includes a slide positioning stage operable to move in a direction substantially parallel to the shaft center axis, and a torque sensor assembly mounted on the slide positioning stage. The torque sensor assembly is operable to engage the tip mass structure when moved into a desired position by the slide positioning stage. The torque sensor assembly is also operable to substantially prevent rotation of the second end of the shaft when engaged with the tip mass structure. The first computer-controlled motor is operable to rotate the first end of the shaft through a known rotational increment while the torque sensor assembly generates a torque signal indicative of torque on the second end of the shaft.

In some embodiments, the apparatus includes a load sensor arm having a first end and a second end. The second end of the load sensor arm is attached to the oscillation inducement arm such that the load sensor arm and the oscillation inducement arm form a substantially V-shaped configuration. In this configuration, the second computer-controlled motor imparts rotation simultaneously to the load sensor arm and the oscillation inducement arm. A load sensor, which is mounted on the first end of the load sensor arm, generates a load signal when pressed against the shaft. The second computer-controlled motor is operable to rotate the load sensor arm to press the load sensor against the shaft whereby the shaft is flexed to a bent position. The first computer-controlled motor is operable to rotate the shaft about the shaft center axis and generate a rotation angle signal while the load sensor is pressed against the shaft. The computer processor then determines information indicative of stiffness asymmetry of the shaft based on the load signal and rotation angle signal.

In another aspect, the invention provides an apparatus for measuring the stiffness asymmetry of a shaft having a first end, a second end, and a shaft center axis extending from the first end to the second end. The apparatus includes a clamping assembly for securing the first end of the shaft. A load sensor arm is disposed adjacent the second end of the shaft. A load sensor, which is mounted on a first end of the load sensor arm, generates a load signal when pressed against the shaft. A computer-controlled motor, which is attached to the second end of the load sensor arm, rotates the load sensor arm to press the load sensor against the shaft so that the shaft is flexed to a bent position. Another computer-controlled motor imparts rotation to the clamping assembly, thereby causing the shaft to rotate about the shaft center axis. As the shaft is rotated, the computer-controlled motor generates a rotation angle signal.

Based on the load signal and rotation angle signal, the computer processor determines information indicative of stiffness asymmetry of the shaft.

In yet another aspect, the invention provides an apparatus for measuring torsional stiffness of a shaft having a first end, a second end, and a shaft center axis extending from the first end to the second end. The apparatus includes a clamping assembly for securing the first end of the shaft. A tip mass structure is securely attached to the second end of the shaft. A computer-controlled motor imparts rotation to the clamping assembly, thereby causing the shaft to rotate about the shaft center axis. As the shaft is rotated, the computer-controlled motor generates a rotation angle signal. The apparatus includes a slide positioning stage that is operable to move in a direction substantially parallel to the shaft center axis. A torque sensor assembly, which is mounted on the slide positioning stage, is operable to engage the tip mass structure when moved into a desired position by the slide positioning stage. When engaged with the tip mass structure, the torque sensor assembly substantially prevents rotation of the second end of the shaft. The computer-controlled motor rotates the first end of the shaft through a rotational angle until the torque sensor assembly generates a torque signal corresponding to a predetermined torque value. The apparatus includes a computer processor that determines information indicative of the torsional stiffness of the shaft based on the predetermined torque value and the rotation angle signal.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIGS. 12A-12C depict various positions of a shaft manipulation assembly according to a preferred embodiment;

FIG. 13 depicts a front view of a tip centering structure according to a preferred embodiment;

FIG. 14 depicts a rear view of a tip centering structure according to a preferred embodiment;

FIG. 15 depicts a shaft seating structure according to a preferred embodiment;

FIGS. 23A-23D depict a line marking assembly for marking a line on a shaft to be used in the assembly of a golf club or other structural member.

DETAILED DESCRIPTION

Figure 1:
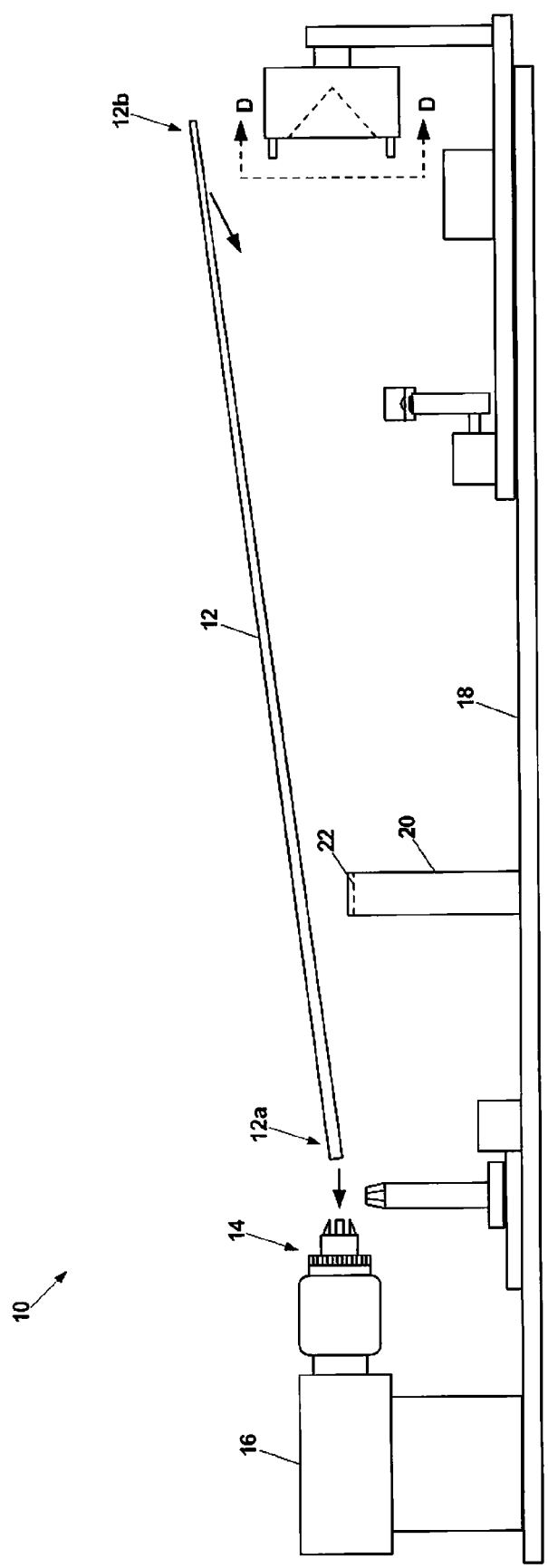
FIGS. 1-5 depict elevation views of an apparatus for measuring physical characteristics of a shaft during various stages of a shaft measurement process.

FIG. 1 depicts a side elevation view of the mechanical components of a preferred embodiment of an apparatus 10 for measuring physical characteristics of a shaft 12, such as a golf club shaft. The apparatus 10 includes a first clamping assembly 14 for securely holding a first end 12a of the shaft 12, which is also referred to herein as the grip end 12a. In preferred embodiments, the clamping assembly 14 comprises a chuck assembly, which may also be referred to herein as a collet assembly. In the embodiment depicted in FIG. 1, the clamping assembly 14 comprises a keyed chuck assembly.

The clamping assembly 14 is rotationally connected to a first electric motor 16 which provides rotation to the clamping assembly 14. In a preferred embodiment, the first electric motor 16 is a computer-controllable SmartMotor™ model number SM2337DT manufactured by Animatics Corporation, having an incremental encoder with a resolution of 2000 points per revolution (ppr), and an RS232 or RS485 digital serial interface. Computer-controllable features of the first electric motor 16 are discussed in more detail hereinafter. As shown in FIG. 1, the first electric motor is fixedly secured to a base member 18.

In one embodiment, the motor 16 is connected to the clamping assembly 14 through a belt/spindle drive and gear reduction means. In other embodiments, the motor 16 drives the assembly 14 directly. Thus, it will be appreciated that the invention is not limited to any particular drive scheme for the motor 16.

Figure 2:
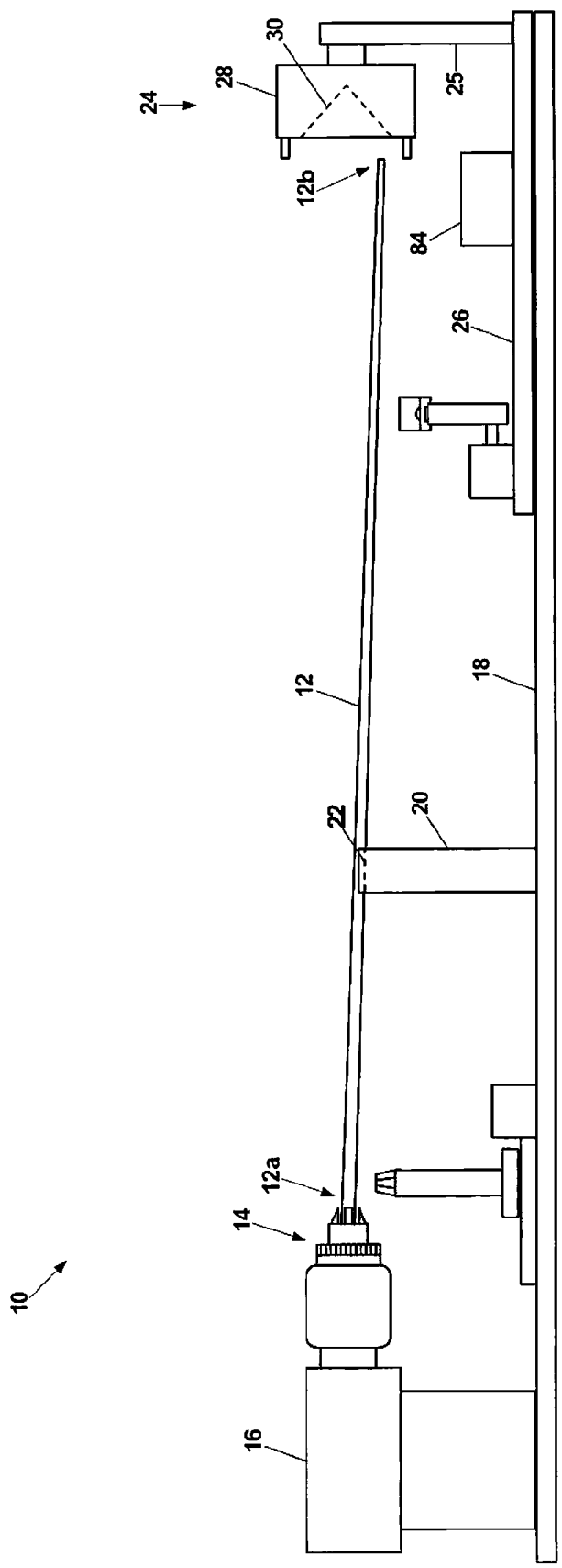

To begin a shaft testing sequence, the grip end 12a of the shaft 12 is inserted into the clamping assembly 14 and a mid-portion of the shaft 12 is allowed to rest on a stand 20, which has a cylindrically-slotted cradle 22 for receiving the shaft 12. FIG. 2 depicts the apparatus 10 and shaft 12 after insertion of the grip end 12a into the clamping assembly 14.

With reference to FIG. 2, the apparatus 10 includes a torque sensor assembly 24 attached to a linear positioning stage 26, which is also referred to herein as a first slide positioning stage. The slide positioning stage 26 provides for horizontal movement of the torque sensor assembly 24 with respect to the fixed base member 18 in a direction substantially parallel to the central axis of the shaft 12. In a preferred embodiment, horizontal movement of the slide positioning stage 26 is provided by a linear actuator 84, such as a model number DGE-25-500 manufactured by Festo.

The torque sensor assembly 24 includes a tip centering structure 28, a side view of which is shown in FIG. 2 and a front view of which is shown in FIG. 13. The tip centering structure 28 is supported above the slide positioning stage 26 by a support arm 25. The tip centering structure 28 includes a conical depression 30 which faces the second end 12b of the shaft, also referred to herein as the tip end 12b, when the shaft 12 is resting on the stand 20. As shown in FIG. 2, when the grip end 12a of the shaft 12 is inserted into the clamping assembly 14 and the shaft 12 is resting on the stand 20, the tip end 12b of the shaft is at a position above a lower edge of the conical depression 30.

Figure 3:
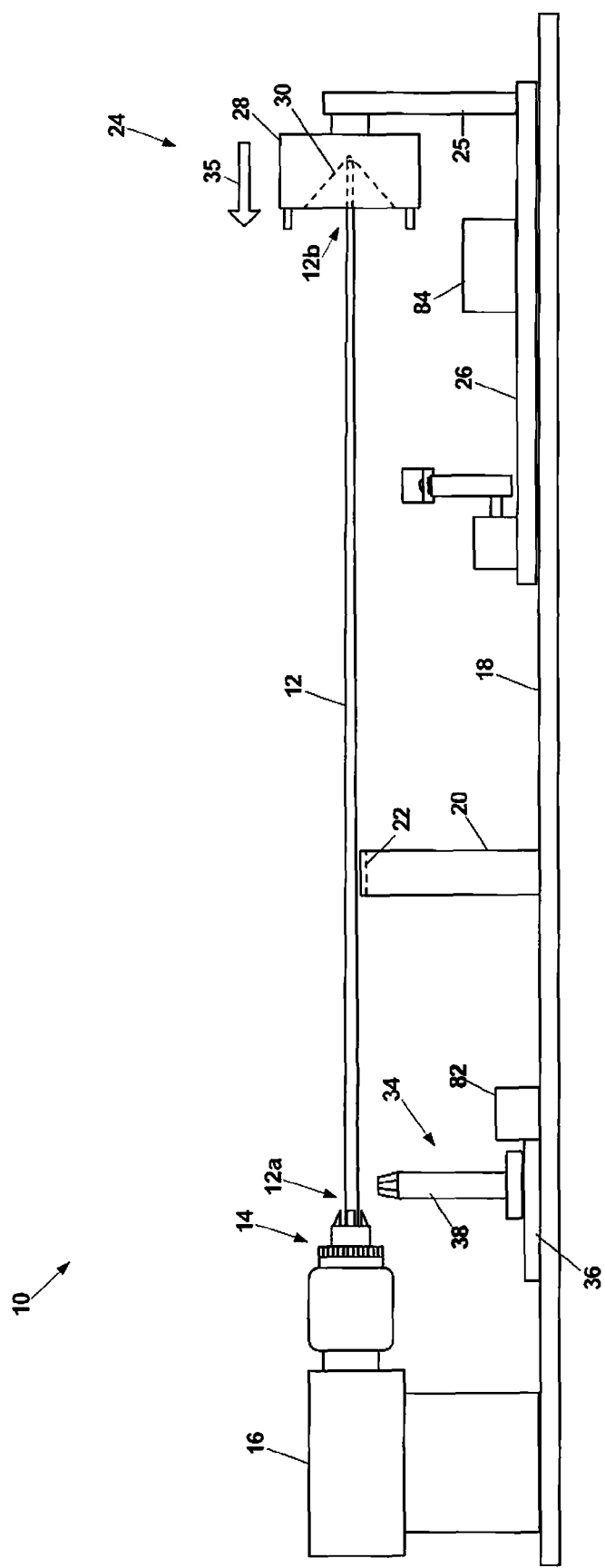

As the slide positioning stage 26 moves the torque sensor assembly 24 horizontally toward the shaft 12 (as indicated by the arrow 35 in FIG. 3), the shaft tip 12b contacts the inner surface of the conical depression 30 which guides the shaft tip 12b toward the center of the conical depression 30. As shown in FIG. 3, when the shaft tip 12b reaches the center of the conical depression 30, the shaft 12 is lifted above the cradle 22 of the stand 20, and the shaft tip 12b is vertically and horizontally aligned with the axial center of the clamping assembly 14.

As the slide positioning stage 26 continues moving the torque sensor assembly 24 horizontally toward the clamping assembly 14 (as indicated by the arrow 35), the grip end 12a of the shaft 12 is pushed against a seating structure provided within the clamping assembly 14. As shown in cross section in FIG. 15, a preferred embodiment of the seating structure 32 comprises a conical projection that extends horizontally toward the grip end 12a of the shaft 12. As the slide positioning stage 26 urges the torque sensor assembly 24 to push the shaft 12 against the seating structure 32, the grip end 12a contacts the outer surface of the conical projection which guides the grip end 12a toward the center of the clamping assembly 14. When the grip end 12a reaches the center of the conical projection, the center axis of the shaft 12 is substantially horizontal and the grip end 12a of the shaft 12 is vertically and horizontally substantially aligned with the tip end 12b. The shaft 12 is now in position to be clamped securely by the clamping assembly 14.

At this point in the shaft securing process, the overall length of the shaft 12 may be determined and recorded. The length of the shaft 12 is determined based on the position of the slide positioning stage 26 relative to the clamping assembly 14. More specifically, the length of the shaft 12 is determined based on the position of the conical depression 30 against which the tip end 12b of the shaft is seated relative to the position of the seating structure 32 in the clamping assembly 14 (FIG. 15) against which the grip end 12a of the shaft is seated. The distance between the seating structure 32 and a reference position of the slide stage 26 is known. For example, the reference position of the slide stage 26 may be one of its limits of travel, such as the limit which is farthest from the clamping assembly 14. To determine the shaft length, the computer processor 90 reads a position value provided by the linear actuator 84 when the shaft tip end 12b is seated within the conical depression 30, and subtracts this position value from the reference position. The shaft length value may then become a portion of the shaft data included in a report along with other shaft characteristics.

Figure 4:
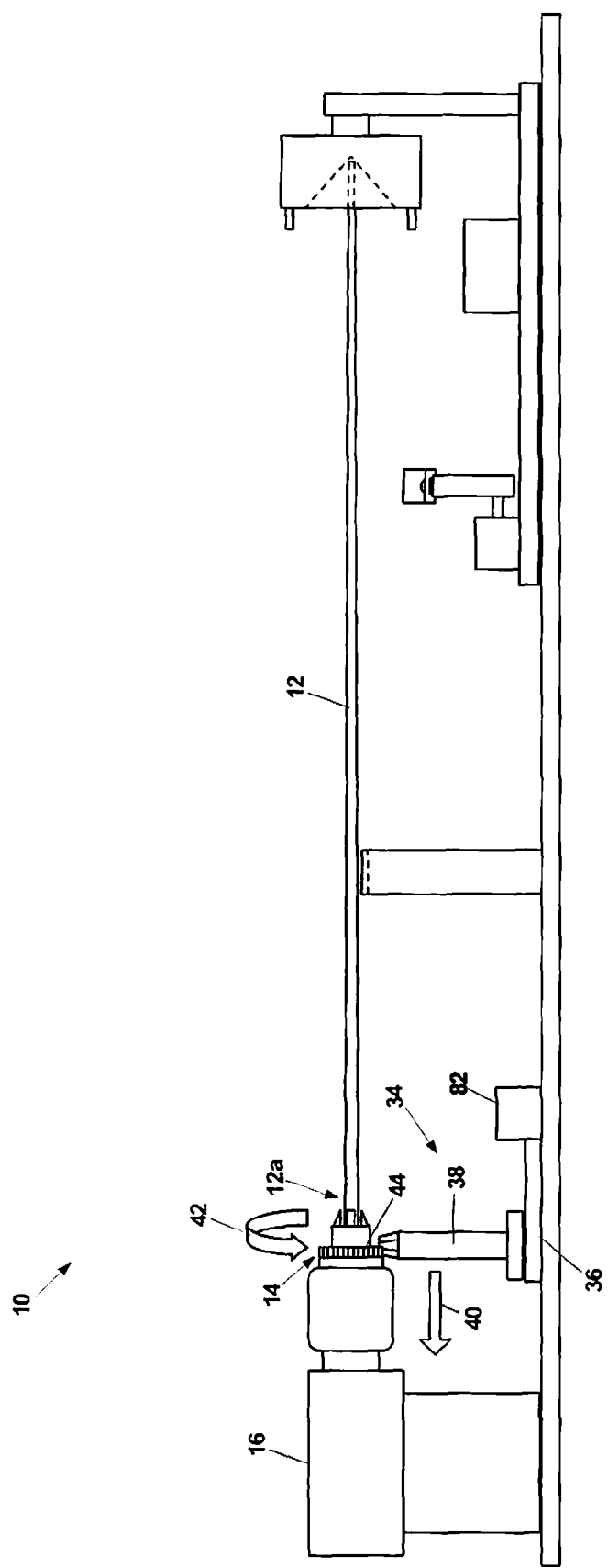
Figure 5:
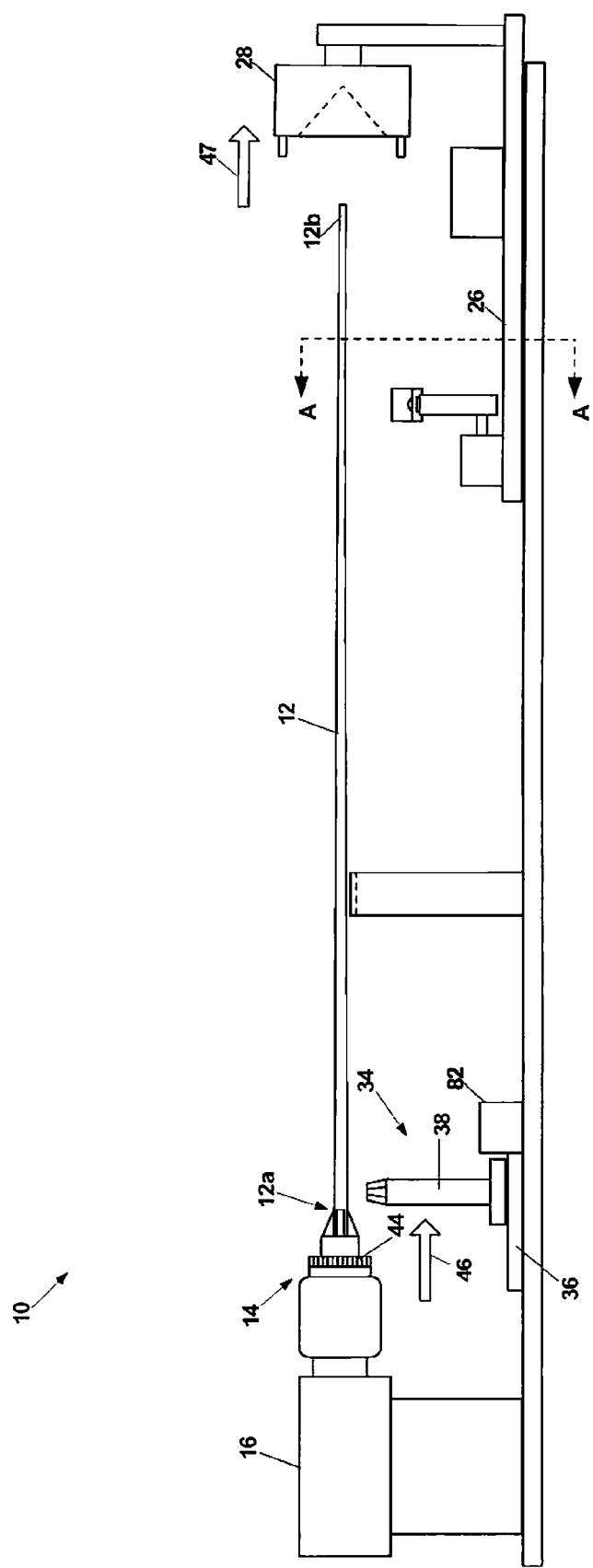

As shown in FIGS. 3 and 4, the apparatus 10 includes a chuck key positioning assembly 34, the purpose of which is to engage the chuck teeth 44 of the clamping assembly 14. The chuck key positioning assembly 34 includes a chuck teeth restraining device 38, such as a chuck key or similar device, attached to a second slide positioning stage 36. Once the shaft 12 has been positioned as described above, the second slide positioning stage 36 moves the chuck teeth restraining device 38 horizontally toward the clamping assembly 14 as indicated by the arrow 40 in FIG. 4 so that the chuck teeth restraining device 38 firmly engages the chuck teeth 44. The second slide positioning stage 36 is powered by a third electric motor 82, which in a preferred embodiment comprises a model number SM2315D manufactured by Animatics Corporation. With the chuck teeth restraining device 38 holding the chuck teeth 44 to prevent their rotation, the electric motor 16 is activated to rotate the clamp assembly 14. As the clamp assembly 14 rotates with the chuck teeth 44 held stationary, the collet of the clamping assembly 14 tightens down on the grip end 12a of the shaft 12 (step 200 of FIG. 21). As described in more detail below, the motor 16 stops rotating when the torque applied to the clamping assembly 14 reaches about 2-20 ft-lbs. The second slide positioning stage 36 then moves the chuck teeth restraining device 38 horizontally away from the clamping assembly 14 as indicated by the arrow 46 in FIG. 5 so that the chuck teeth restraining device 38 disengages from the chuck teeth 44. Also, the first slide positioning stage 26 moves the tip centering structure 28 horizontally away from the tip end 12b of the shaft 12 as indicated by the arrow 47 in FIG. 5.

Figure 6C:
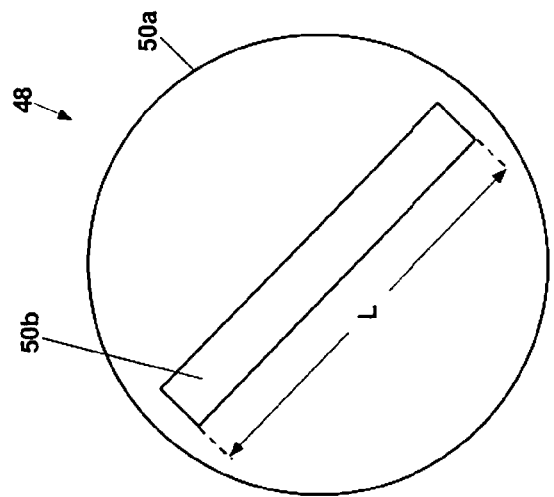
FIGS. 6A-6C depict a preferred embodiment of a tip mass assembly.
Figure 6B:
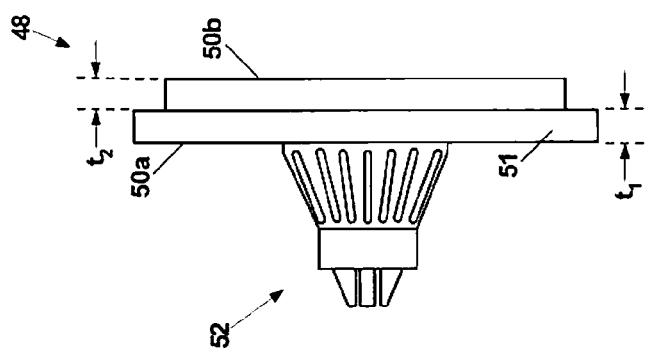
Figure 6A:
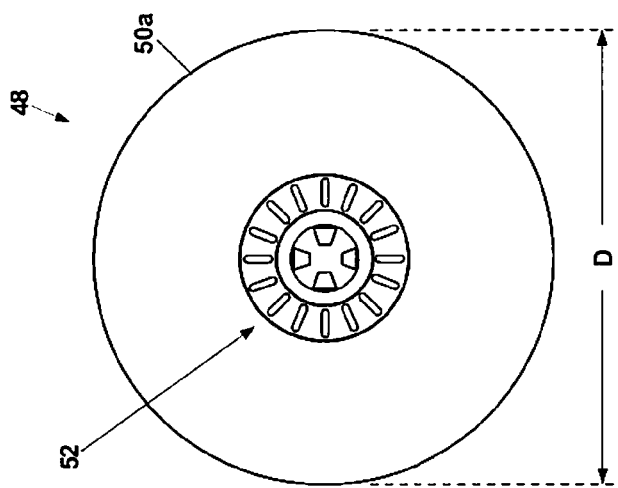

FIGS. 6A, 6B and 6C depict front, side and rear views, respectively, of a preferred embodiment of a tip mass assembly 48. The tip mass assembly 48 includes a cylindrical tip mass 50a, an engagement bar 50b and a second clamping assembly 52. In a preferred embodiment, the tip mass 50a is formed from a single piece of thermoplastic material, such as nylon, by injection molding or machining or both. The engagement bar 50b is preferably formed from metal, such as steel. The preferred diameter D and thickness $t_1$ of the cylindrical tip mass 50a is about 3-5 inches and 0.25-1.0 inch respectively. The preferred thickness $t_2$ of the engagement bar 50b is about 0.125 inch. The length L of the engagement bar 50b is preferably about the same as the diameter D of the cylindrical tip mass 50a, or slightly less. In preferred embodiments, the second clamping assembly 52 comprises a chuck assembly, which may also be referred to herein as a collet assembly. The total mass of the tip mass assembly 48 preferably ranges from about 150 to 350 grams, and is most preferably about 200 grams. The apparatus may include multiple tip mass assemblies 48 having different weights to accommodate shafts of various materials and relative stiffnesses.

Figure 7:
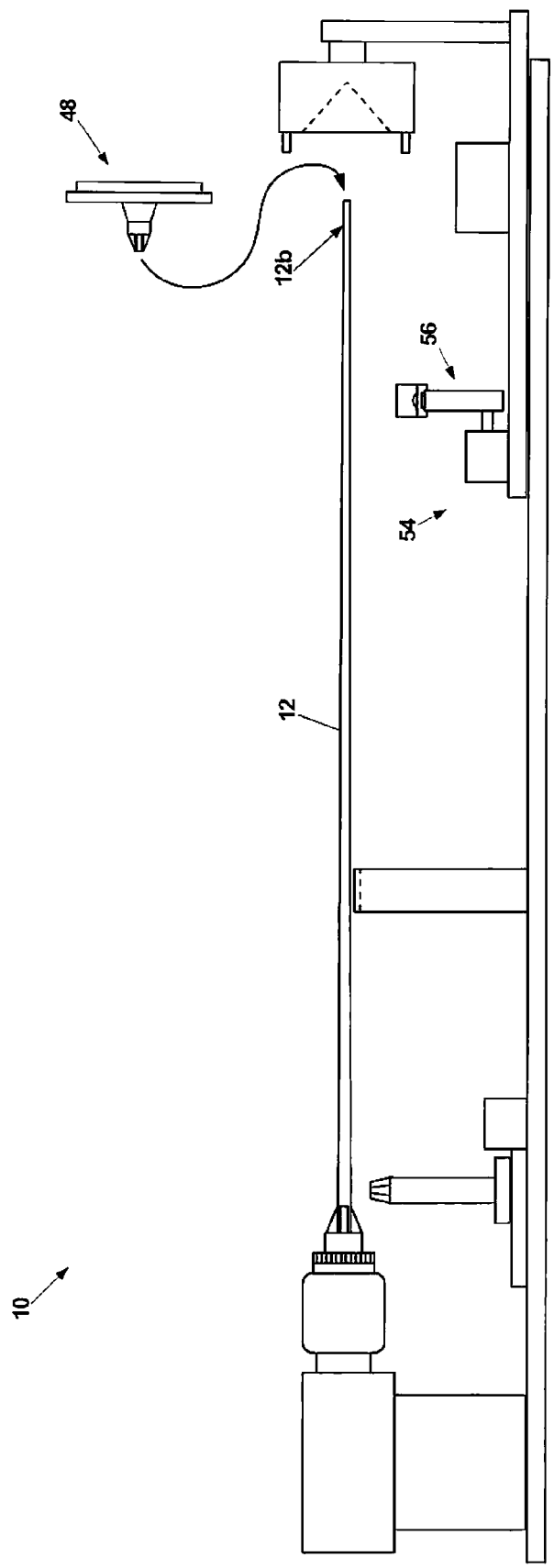
FIGS. 7-11 depict elevation views of an apparatus for measuring physical characteristics of a shaft during various stages of a shaft measurement process.
Figure 8:
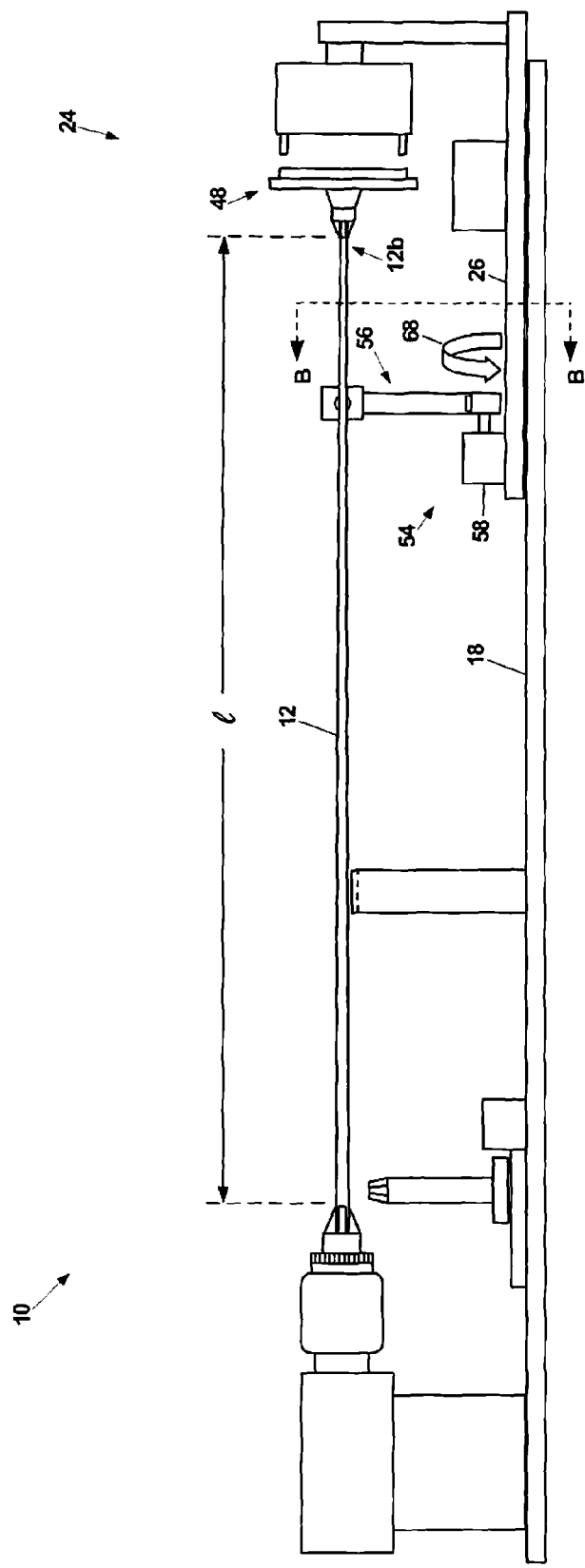

As shown in FIG. 7, the tip mass assembly 48 is attached to the tip end 12b of the shaft 12 (step 202 of FIG. 21) after the grip end 12a of the shaft 12 has been secured in the first clamping assembly 14. The attachment of the tip mass assembly 48 to the tip end 12b is preferably accomplished by manually tightening the second clamping assembly 52. FIG. 8 depicts the tip mass assembly 48 attached to the tip end 12b of the shaft 12. In this configuration, the shaft 12 is ready for testing.

FIGS. 7-9 and 12A-12C depict the configuration and operational positions of a preferred embodiment of a shaft manipulation assembly 54. The shaft manipulation assembly includes a V-arm assembly 56 which is attached to a motor shaft 60 that extends from a second electric motor 58. The V-arm assembly 56 includes a load sensor arm 56a and an oscillation inducement arm 56b. In a preferred embodiment, the load sensor arm 56a and the oscillation inducement arm 56b are machined from a single piece of aluminum in a V-configuration, wherein the apex of the V is connected to the motor shaft 60. However, it will be appreciated that the load sensor arm 56a and the oscillation inducement arm 56b could be formed from rigid plastic or another fairly rigid material.

In a preferred embodiment, the second electric motor 58 is a computer-controllable SmartMotor™ model number SM2315 D manufactured by Animatics Corporation, having an incremental encoder with a resolution of 2000 points per revolution (ppr), and an RS232 or RS485 digital serial interface. As shown in FIGS. 8 and 12A-12C, the second electric motor 58 is fixedly secured to the slide positioning stage 26. The second electric motor 58 is used to rotate the load sensor arm 56a and the oscillation inducement arm 56b to three principal positions which are depicted in FIGS. 12A, 12B and 12C, although other positions are also possible. In a first position, depicted in FIG. 12A, both of the arms 56a and 56b are well clear of the shaft 12. In a second position, depicted in FIG. 12B, the load sensor arm 56a engages the shaft 12. In a third position, depicted in FIG. 12C, the oscillation inducement arm 56b engages the shaft 12.

As shown in FIG. 12B, a load sensor 64 is attached to the end of the load sensor arm 56a. In a preferred embodiment, the load sensor 64 is a quartz compression high-impedance load cell manufactured by Kistler under model number 9212.

Attached to the load sensor 64 is a V-shaped shaft retaining member 62. As shown in FIG. 12B, the purpose of the shaft retaining member 62 is to hold the shaft 12 in a centered position so that any load exerted by the shaft 12 against the arm 56a is centered on the load sensor 64.

Figure 16:
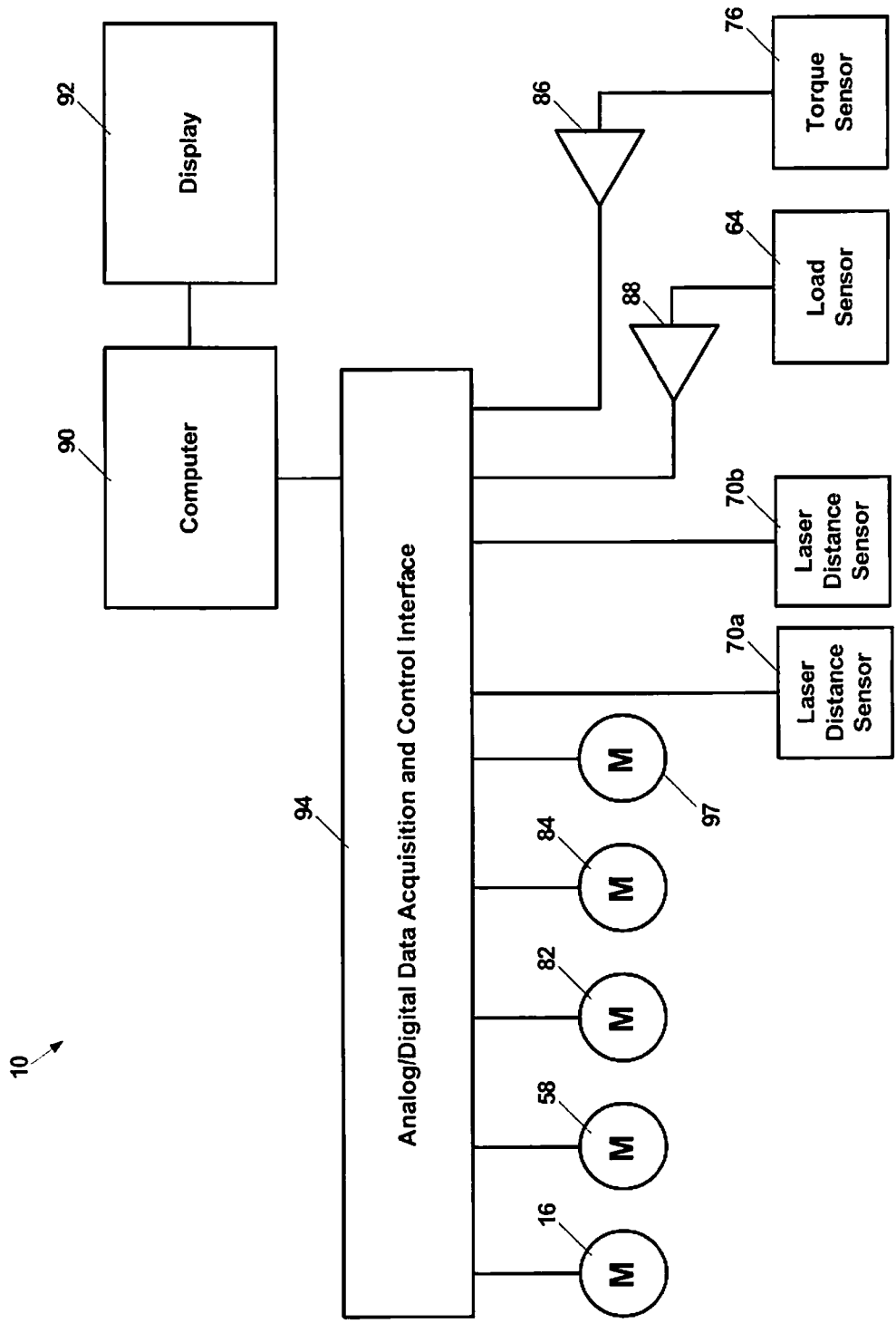
FIG. 16 depicts an electrical block diagram of an apparatus for measuring physical characteristics of a shaft according to a preferred embodiment.

FIG. 16 depicts an electrical block diagram of the apparatus 10. As shown in FIG. 16, the apparatus includes the four motors or actuators discussed above, all of which are controlled by a computer processor 90. These motors include the first electric motor 16, the second electric motor 58, the third electric motor 82, and the linear actuator motor 84. Output signals from the motors and control signals to the motors are routed through an analog/digital data acquisition and control interface 94, such as a model number USB-1408FS manufactured by Measurement Computing. Analog output signals from the load sensor 64 and the torque sensor 76 are amplified by amplifiers 88 and 86, respectively, converted to digital signals by the interface 94, and provided to the computer processor 90. Analog output signals from the distance sensors 70a and 70b are also converted to digital signals by the interface 94 and provided to the computer processor 90, as depicted and described in conjunction with FIGS. 10 and 17A-17C.

Figure 21:
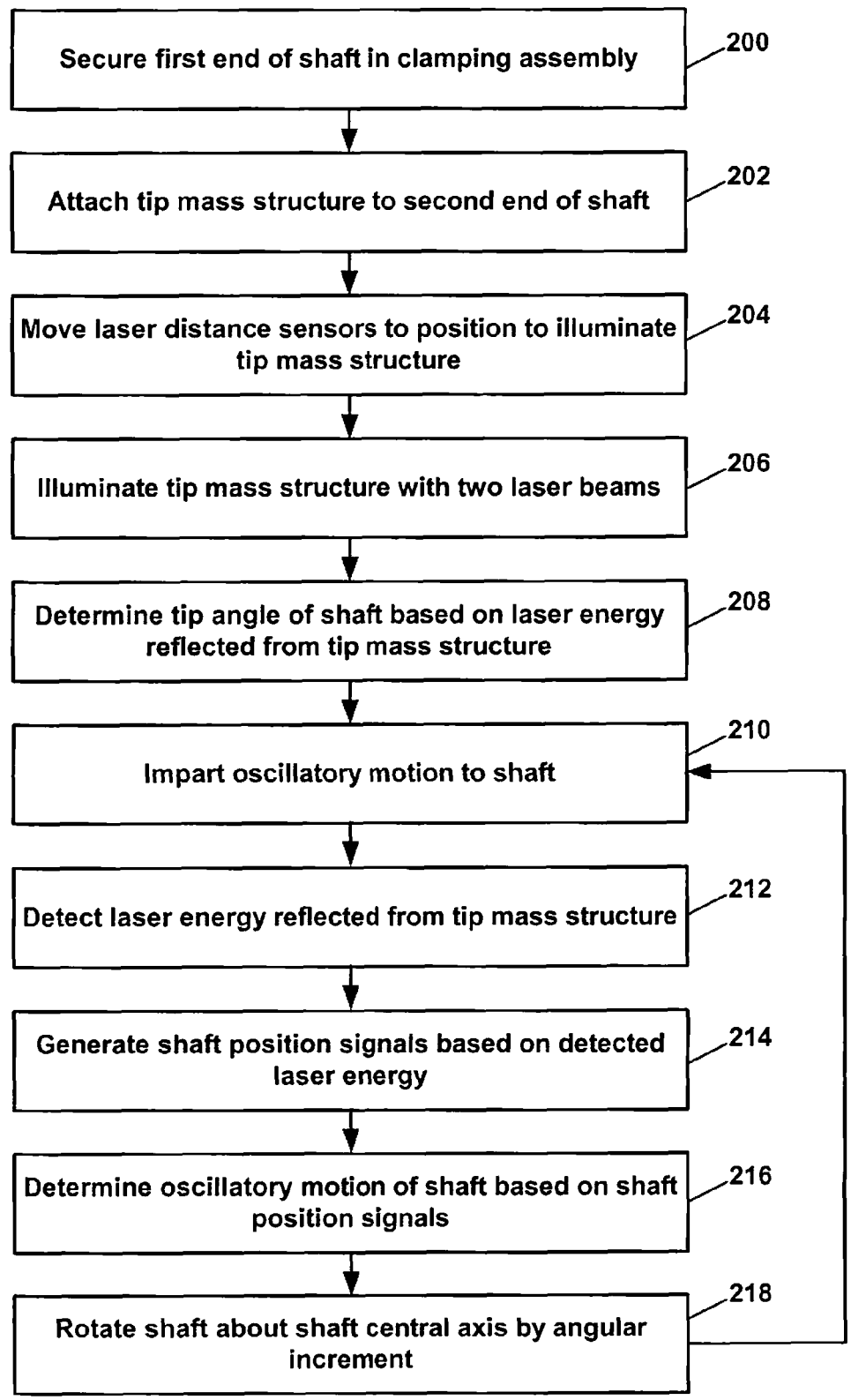
FIGS. 21 and 22 depict methods for determining various physical characteristics of a shaft.

Referring to FIGS. 10 and 17A-17C, prior to beginning the shaft testing process, the system 10 moves the slide positioning stage 26 to position the distance sensors 70a and 70b so that the laser beams they produce will be incident upon the cylindrical surface 51 of the tip mass assembly 48 (step 204 of FIG. 21). In a preferred embodiment, this is accomplished by moving the slide positioning stage 26, under control of the computer processor 90, from an initial position such as shown in FIG. 8 toward the clamping assembly 14. During this movement, the computer processor 90 monitors the output of the one or both of the laser position sensors 70a-70b. From the point where the output of the position sensor 70a or 70b transitions from a very large (infinite) distance down to a small distance (in the range of $d_1$ or $d_2$ shown in FIG. 17B), the computer 90 controls the stage 26 to move further by about one half of $t_1$ (FIG. 6B) and then stop. This positions the laser beams of the sensors 70a-70b approximately in the center of the cylindrical surface 51. At this position, the position output from the slide stage 26 is stored by the processor 90 as a reference position to be used in later repositioning operations.

As mentioned above, one of the many tests performed by the apparatus 10 is a test to determine asymmetries in the stiffness of a shaft about its circumference. This test is performed using the shaft manipulation assembly 54 and the first electric motor 16 under control of the computer processor 90. Once the shaft 12 has been secured in the clamping assembly 14 as described above, the second electric motor 58 is activated by the computer processor 90 to rotate the V-arm assembly 56 into the position depicted in FIGS. 8 and 12B (step 230 of FIG. 22). This rotation is indicated by the arrow 68 in FIG. 8. In this position, the shaft 12 is pushed into a slightly bent position, such that the center of the shaft 12 as shown in FIG. 12B is about one inch to three inches away from its "at rest" position depicted in FIG. 12A. In this bent position, the shaft 12 is exerting a force against the load sensor 64. While maintaining the V-arm assembly 56 in the position shown in FIGS. 8 and 12B, the computer processor 90 activates the first electric motor 16 to slowly rotate the shaft 12 (step 232 of FIG. 22) while collecting load data from the load sensor 64 and angular rotation data from the motor 16 (step 234). Once data has been collected for at least a full rotation of the shaft 12, the second electric motor 58 is activated by the computer processor 90 to rotate the V-arm assembly 56 into the position depicted in FIGS. 10 and 12A.

Figure 18:
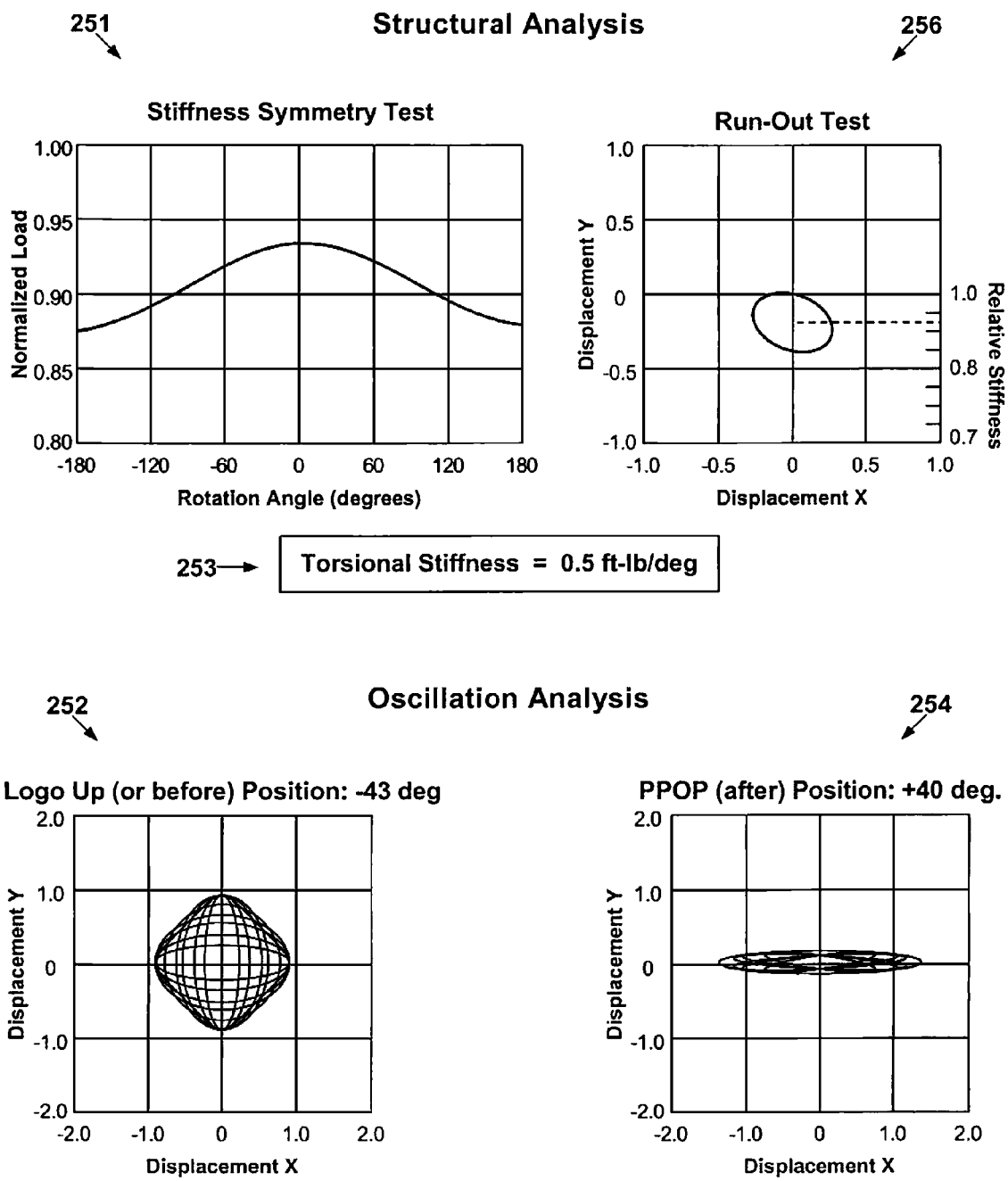
FIG. 18 depicts an example of a data sheet containing plots of various shaft characteristic data.

In this manner, the computer processor 90 collects force-versus-angle data or shaft stiffness symmetry data for a plurality of incremental rotational positions of the shaft 12. Ideally, the force of the shaft 12 pressing against the load sensor 64 would be constant for all rotational positions of the shaft 12. In reality, however, most shafts have some asymmetries in their construction which cause this force to vary as the shaft is rotated. In a preferred embodiment of the invention, the force-versus-angle data collected by the computer processor 90 is plotted on the display device 92 and/or on a hard-copy report sheet (step 236 of FIG. 22). An example of a plot 251 of shaft stiffness symmetry data is shown in FIG. 18. The rotational position corresponding to the largest measured load value is referred to herein as the most stiff side or "hard side" of the shaft. For example, in the load symmetry plot shown in FIG. 18, the hard side is at about 0 degrees. The rotational position corresponding to the smallest measured load value is referred to herein as the "soft side" of the shaft. For example, in the load symmetry plot shown in FIG. 18, the soft side is at about 180 degrees.

Figure 9:
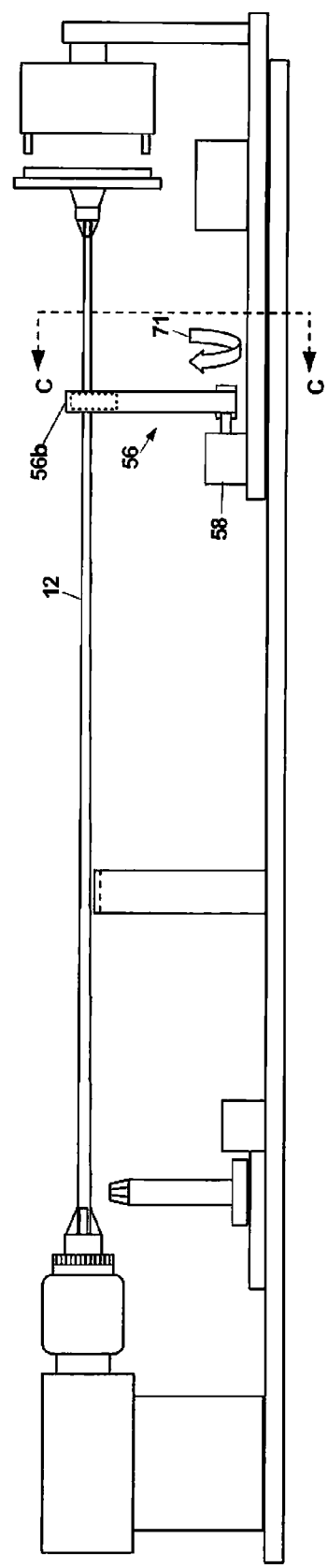
Figure 10:
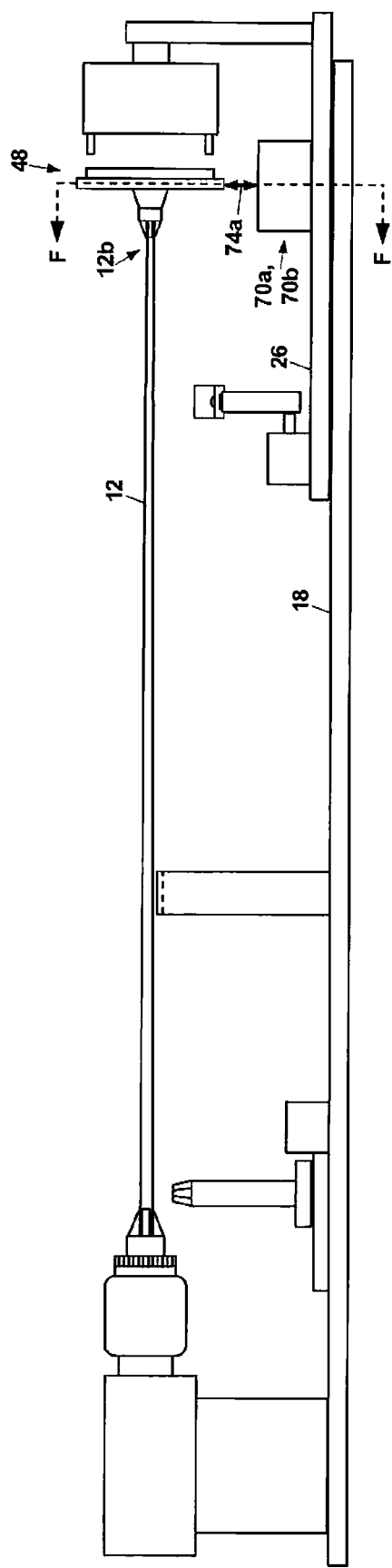

Another of the tests performed by the apparatus 10 is a test to determine the principal plane of planar oscillation of the shaft 12. As discussed above, this test involves inducing an oscillation in the tip end 12b of the shaft 12 and periodically determining locations of the axial center of the shaft 12 while it is oscillating. The shaft manipulation assembly 54, and in particular the oscillation inducement arm 56b of the V-arm assembly 56, is used to induce this oscillation. As shown in FIGS. 9 and 12C, as the second electric motor 58 rotates the V-arm assembly 56 in the direction indicated by the arrows 71 and 72, the oscillation inducement arm 56b pushes against the shaft 12 to flex the shaft 12 to a bent position (as shown in FIG. 12C). The second electric motor 58 then rapidly rotates in the opposite direction, so that the V-arm assembly 56 assumes the position shown in FIG. 12A. In this manner, the arm 56b rapidly disengages from the bent shaft 12 to allow the shaft to spring back and oscillate freely (step 210 of FIG. 21). The oscillation inducement arm 56b can also be used to stop oscillation of the shaft 12 when it is desirable for the shaft 12 to be still. A pad 66, which may be constructed from rubber, soft plastic or other similar material, is provided on an inside surface of the oscillation inducement arm 56b to aid in dampening oscillation of the shaft 12.

In a preferred embodiment of the invention, the locations of the axial center of the oscillating shaft 12 are determined based on laser energy reflected from the cylindrical surface 51 of the tip mass assembly 48 that is attached to the tip end 12b of the shaft 12. As shown in FIGS. 10 and 17A-17C, embodiments of the invention include a pair of laser distance sensors 70a and 70b, such as a model number OADM 20I4460/S14C distance sensor manufactured by Baumer Ltd, mounted on the slide positioning stage 26. The laser distance sensors 70a and 70b emit laser beams, represented by the arrows 74a and 74b, which are separated by a horizontal distance S (step 206 of FIG. 21). The laser energy is reflected from the cylindrical surface 51 of the tip mass assembly 48, and the reflected laser energy is detected by the laser distance sensors 70a and 70b (step 212) which generate shaft distance signals based on the detected laser energy (step 214).

Figure 17:
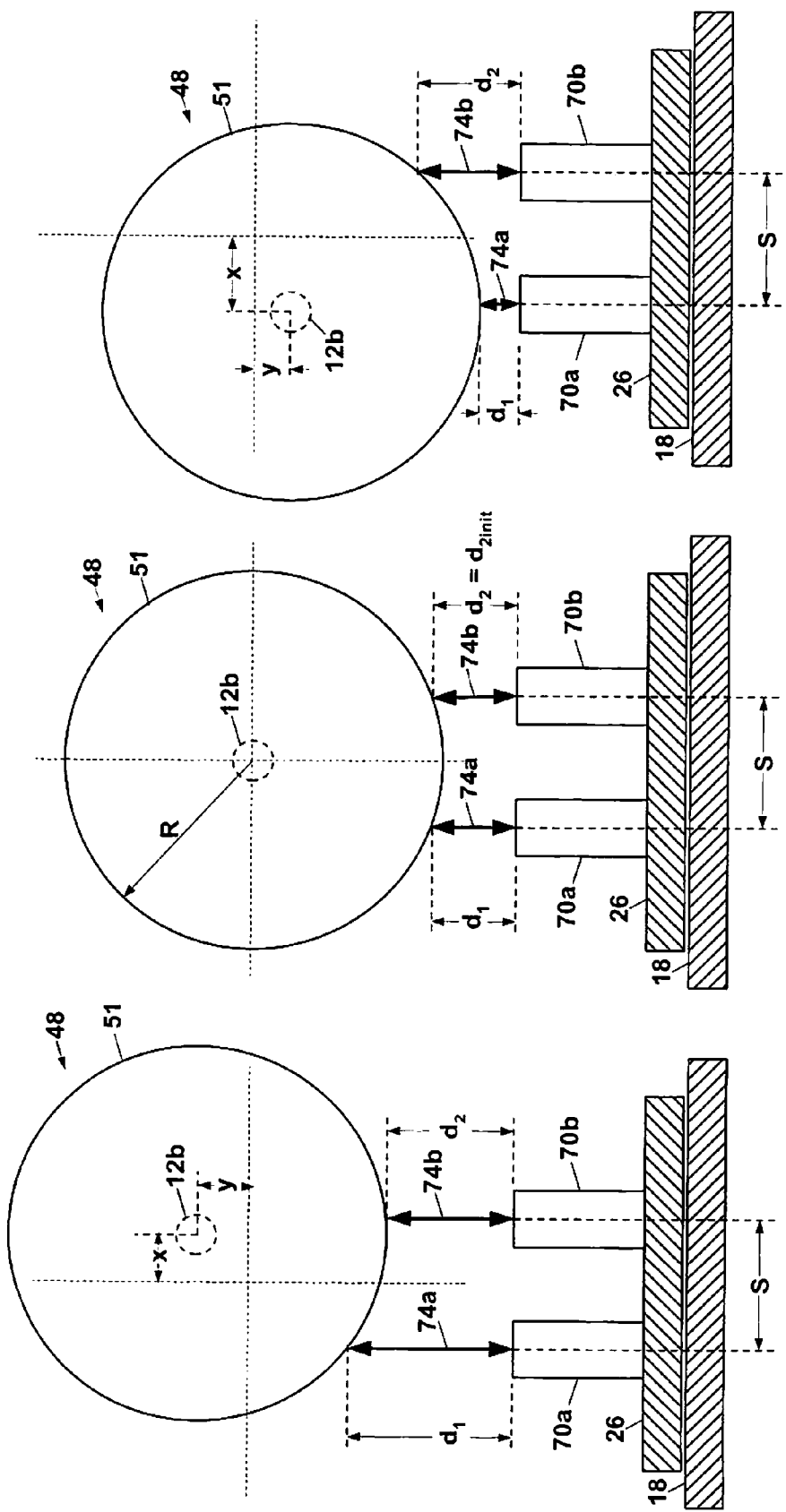
FIGS. 17A-17C depict various positions of a tip mass assembly in relation to laser distance sensors.

As the tip mass assembly 48 oscillates in relation to the laser distance sensors 70a and 70b, the distances $d_1$ and $d_2$ change accordingly. For example, when the tip mass assembly 48 is offset to the right as shown in FIG. 17A, the distance $d_1$ measured by the distance sensor 70a is greater than the distance $d_2$ measured by the distance sensor 70b. Similarly, when the tip mass assembly 48 is offset to the left as shown in FIG. 17C, the distance $d_1$ measured by the distance sensor 70a is less than the distance $d_2$ measured by the distance sensor 70b. The distances $d_1$ and $d_2$, the separation S, and the radius R of the cylindrical surface 51 of the tip mass 50a (FIG. 17B) are used to calculate the horizontal and vertical movement of the axial center of the tip end 12b of the shaft 12 during its oscillation (step 216). These data may also be used to calculate the frequency of vibration of the tip end 12b of the shaft 12.

In a preferred embodiment of the invention, the horizontal and vertical movement of the axial center of the tip end 12b is expressed in rectangular coordinates, where the origin of the rectangular coordinate system is the initial position of the axial center when the shaft is at rest, that is, prior to the inducement of oscillation. For example, the position of the tip end 12b represented in FIG. 17B may be an initial position. In FIGS. 17A and 17C, the cylindrical surface is offset from the initial position by an amount x in the x-direction and an amount y in the y-direction. In one embodiment, values for x and y are calculated by the computer processor 90, or by another computer in communication with the processor 90, based on the following:

$$x = \sqrt{R^2 - \left(\frac{\sqrt{(d_2 - d_1)^2 + S^2}}{2}\right)^2} \times \frac{d_2 - d_1}{\sqrt{(d_2 - d_1)^2 + S^2}}$$

$$y = \sqrt{R^2 - \left(\frac{S}{2} - x\right)^2} - \sqrt{R^2 - \left(\frac{S}{2}\right)^2} + d_2 - d_{2INIT},$$

where $d_{2INIT}$ is the distance measured by the right sensor 74b when the axial center of the tip end 12b is in the initial position as shown in FIG. 17B.

Shaft tip oscillations are induced and tip oscillation coordinate data are calculated as described above at several axial rotational positions of the shaft 12. For example, this data may be determined at 60 degree rotational increments, resulting in five data sets. It will be appreciated that larger or smaller rotational increments may be used, the selection of which will determine how closely the principal planar oscillation plane can be resolved. Between each of the rotational positions of the shaft 12, the second electric motor 58 rotates the oscillation inducement arm 56b into position to stop the oscillation of the shaft 12 and settle it in a position such as shown in FIG. 17B. The first electric motor 16 then rotates the shaft 12 to the next rotational position for the next measurement (step 218 of FIG. 21). These operations of the motors 58 and 16 are preferably performed under control of the computer processor 90.

As shown in FIG. 16, the laser distance sensors 70a and 70b generate analog output signals that are provided to the data acquisition interface 94. One of the functions of the interface 94 is analog-to-digital conversion of the output signals from the distance sensors 70a-70b into digital signals. The digital output of the interface 94 is provided to the computer processor 90 wherein coordinates of the axial center of the tip end 12b of the shaft 12 are calculated. The result of the calculations is a tabulation, for each angular position of the shaft 12, of tip coordinates versus time. In preferred embodiments of the invention, this data is plotted in rectangular coordinates to generate a plot showing the tip oscillatory pattern for each of the angular positions of the shaft 12. Examples of such plots 252 and 254 are shown in FIG. 18. At each angular position of the shaft, the maximum vertical excursion of the shaft center is recorded, as is the oscillation frequency of the shaft 12. These plots may be printed or displayed on the display device 92.

Figure 19:
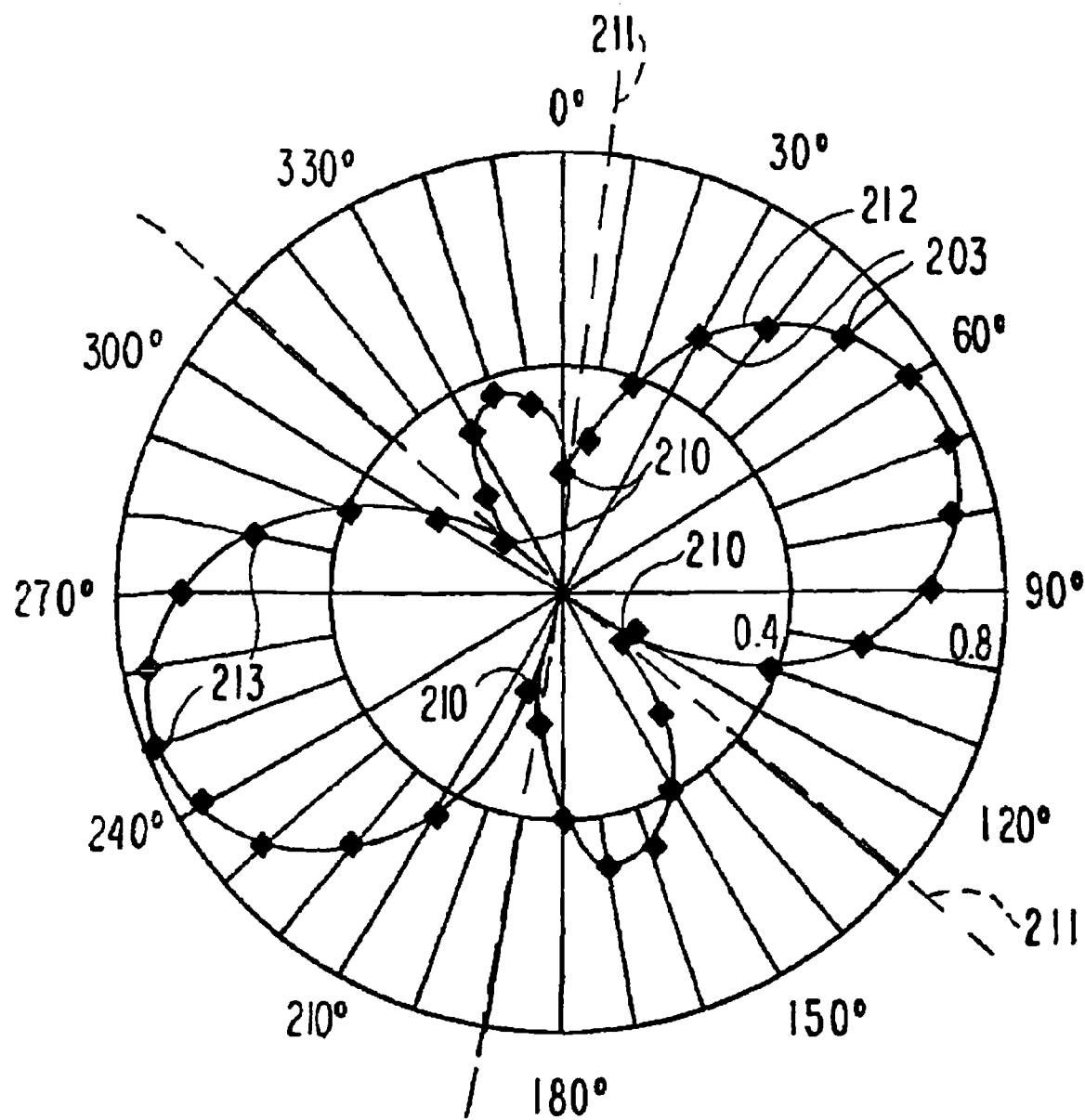
FIG. 19 depicts an example of a plot of maximum vertical excursion of a shaft center in polar coordinates as a function of shaft rotation angle.

According to one preferred embodiment, the principal planar oscillation plane is located by plotting the maximum vertical excursion of the shaft center in polar coordinates as a function of the shaft rotation angle. At each angular position, the distance of the curve from the origin represents the maximum vertical displacement at that angle. For a typical golf club shaft, the resulting plot will have multiple lobes as shown in FIG. 19, although the number of lobes may vary among different shafts. The cusps 210 between the lobes, where the plotted curve approaches closer to the origin, are the local minima of the vertical displacement. Except for very anomalous shafts, the number of cusps 210 is expected to be even, and each cusp 210 at a particular rotation angle should have a corresponding cusp 180° away from it. Each such pair (indicated by dashed lines 211) represents one of the planar oscillation planes of the shaft. The principal planar oscillation plane is ordinarily represented by the pair of cusps that approach closest to the origin. Using this technique, the principal planar oscillation plane can be precisely located even if its position does not correspond to one of the angular positions at which measurements were actually taken.

In a most preferred embodiment, shaft tip oscillations are induced and tip oscillation coordinate data are calculated only at certain rotational positions that are within an angular sector on either side of the "hard side" of the shaft. This angular sector is preferably about ±30 degrees on either side of the hard side. In this embodiment, the principal planar oscillation plane (PPOP) corresponds to the shaft rotational position within this ±30 degree range at which the ratio of maximum vertical oscillation amplitude ($y_{max}$) to maximum horizontal oscillation amplitude ($x_{max}$) is one percent or less. This point can be found by doing a first oscillation measurement at a first rotational position corresponding to the hard side, and doing a second measurement at a second position which is ±10 degrees from the first position. If the ratio of $y_{max}/x_{max}$ at the second position (±20 degrees from the hard side) is greater than one percent but smaller than it was at the first position, then an oscillation test is done at a third position (±30 degrees from the hard side). If the ratio of $y_{max}/x_{max}$ at the third position is greater than one percent but smaller than it was at the second position, then an oscillation test is done at a fourth position which is outside the 30 degree range. If the ratio of $y_{max}/x_{max}$ at the fourth position is greater than one percent but smaller than it was at the third position, this means the PPOP position must be outside the range of ±30 degrees from the hard side of the shaft. In this situation, the shaft may be discarded as unacceptable.

If the ratio of $y_{max}/x_{max}$ is determined to be less than one percent at any measurement point within the range of ±30 degrees from the hard side, that point is designated as the PPOP and is so indicated on the plot 254 as shown in FIG. 18. This PPOP position should correspond to one of the cusps 211 in the plot depicted in FIG. 19.

For comparison purposes, the shaft oscillation test may also be performed with the shaft rotated to its "logo up" position to gather data regarding the oscillation of the shaft in its factory installed orientation. Conventional golf clubs are typically assembled with the manufacturer's logo, which is printed on the shaft, facing toward the club head face, in what is referred to as a "logo up" configuration. Some manufacturers align the logo 180° away from the club head face in a "logo down" configuration, or in other configurations. During the "logo up" test, the shaft is positioned in its original factory installed position, but the test is referred to as the "logo up" test because most frequently the factory position has the logo facing upward. In any case, because the logo is printed at a random location on the shaft circumference—i.e., without the benefit of knowing the location of any planar oscillation plane—the factory alignment is purely random regardless of the actual logo position. The plot 252 shown in FIG. 18 depicts an example of results of a "logo up" test.

Figure 11:
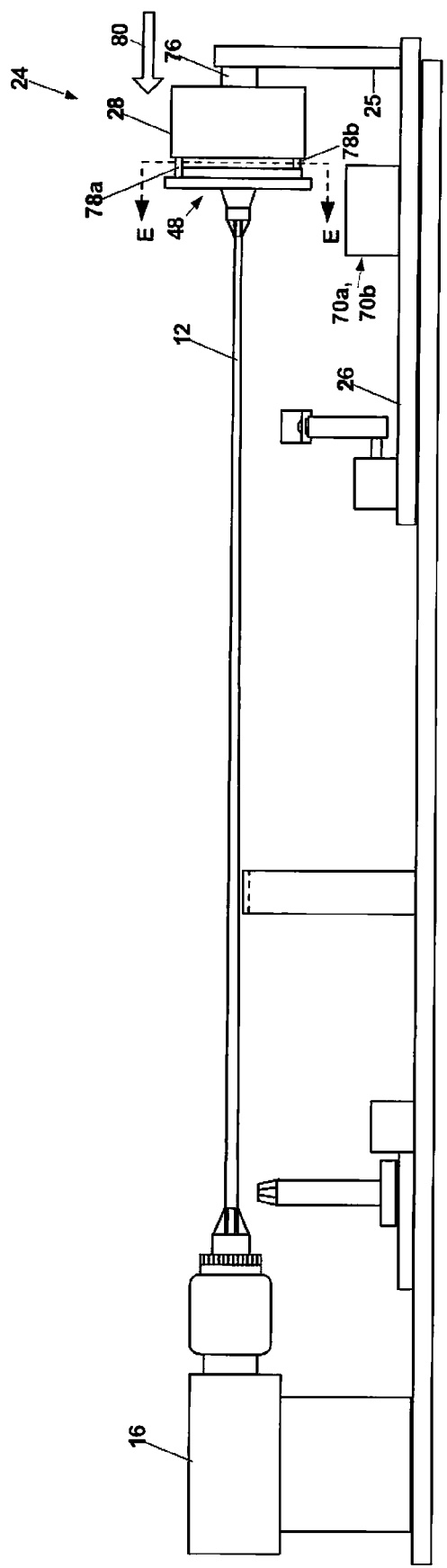

Another of the tests performed by the apparatus 10 is a test to determine the torsional stiffness or torsional rigidity of the shaft 12. This test is performed using the torque sensor assembly 24 as shown in FIG. 11. The torque sensor assembly 24 includes a torque sensor 76 attached between the support arm 25 and the tip centering structure 28. In a preferred embodiment, the torque sensor 76 is a quartz sensor manufactured by Kistler under model number 9039 having a measurement range of about ±3.7 ft-lb. As shown in FIGS. 11, 13 and 14, the torque sensor assembly 24 also includes a pair of projections 78a and 78b extending from the tip centering structure 28 and disposed on opposite sides of the conical depression 30. Under control of the computer processor 90, the slide positioning stage 26 moves the torque sensor assembly 24 toward the tip mass assembly 48 as indicated by the arrow 80 in FIG. 11 (step 220 of FIG. 22). In this way, the projections 78a and 78b are positioned adjacent the rear face of the cylindrical tip mass 50a.

Figure 22:
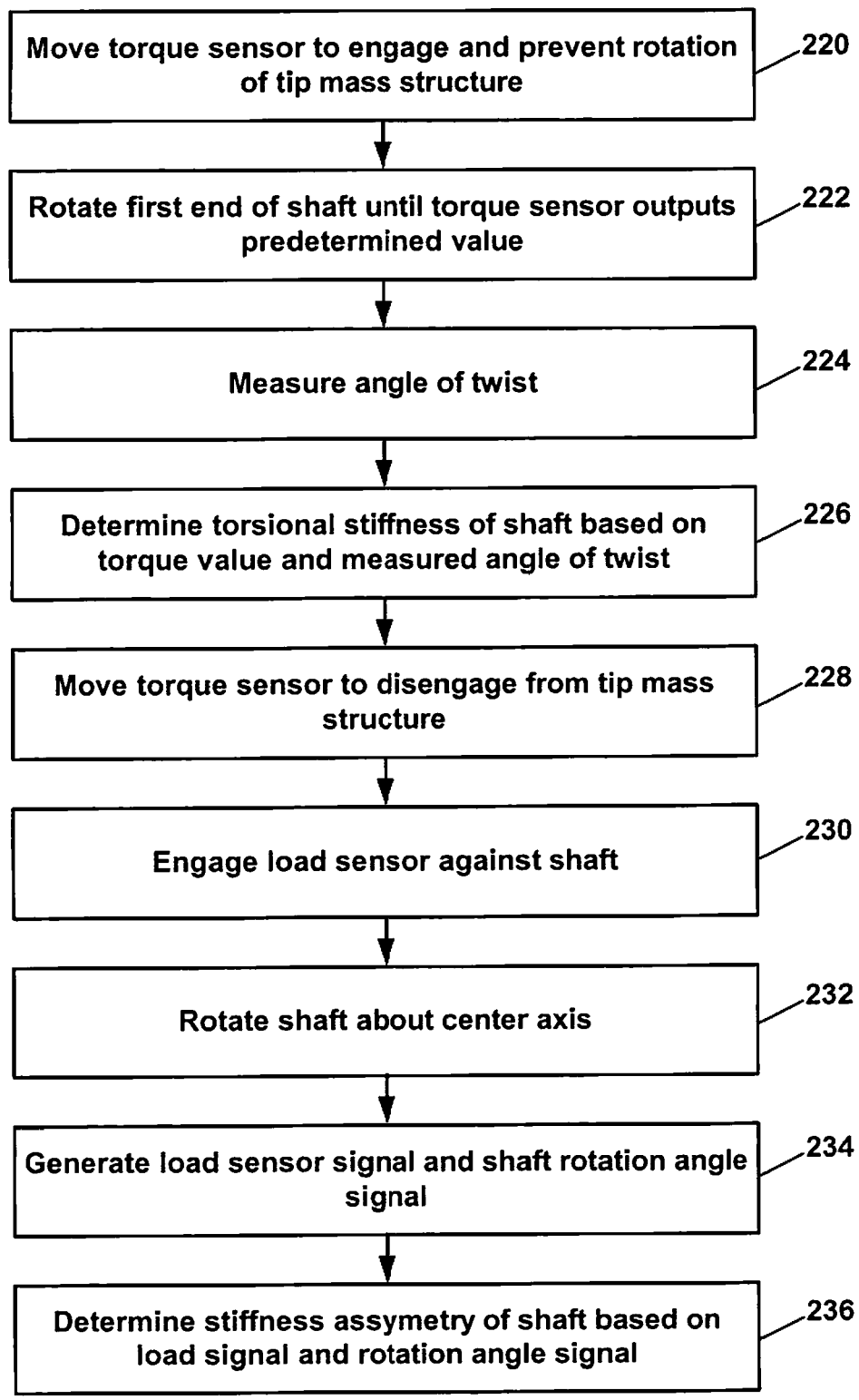

Under control of the computer processor 90, the first electric motor 16 then rotates the shaft 12 until the engagement bar 50b of FIG. 14 just touches the projections 78a and 78b, such that further rotation of the shaft 12 would cause the engagement bar 50b to exert torque on the tip centering structure 28. This rotational position of the shaft 12 is the reference position for the torsional stiffness measurement. The computer processor 90 then controls the first electric motor 16 to rotate further in the same direction until the output of the torque sensor 76 indicates a torque value substantially equivalent to a torque value previously stored in memory of the processor 90, such as a value within the range of about 0.5-3 ft-lbs (step 222 of FIG. 22). When the predetermined torque value is reached, the rotational position of the shaft 12 relative to the reference position is determined based on the angle value output from the motor 16 (step 224). The torsional stiffness (TS) of the shaft 12 (ft-lb per degree) is then calculated by the computer processor according to:

$$TS = \frac{T}{\phi},$$

where T is the predetermined torque value (ft-lb) measured by the torque sensor 76 and $\phi$ is the angle of twist in degrees between the reference position and the position at which the measured torque reached the predetermined value (step 226 of FIG. 22). In a preferred embodiment of the invention, the torsional stiffness value calculated by the computer processor 90 is displayed on the display device 92 and/or is printed on a hard-copy report sheet as shown at 253 in FIG. 18.

Figure 20:
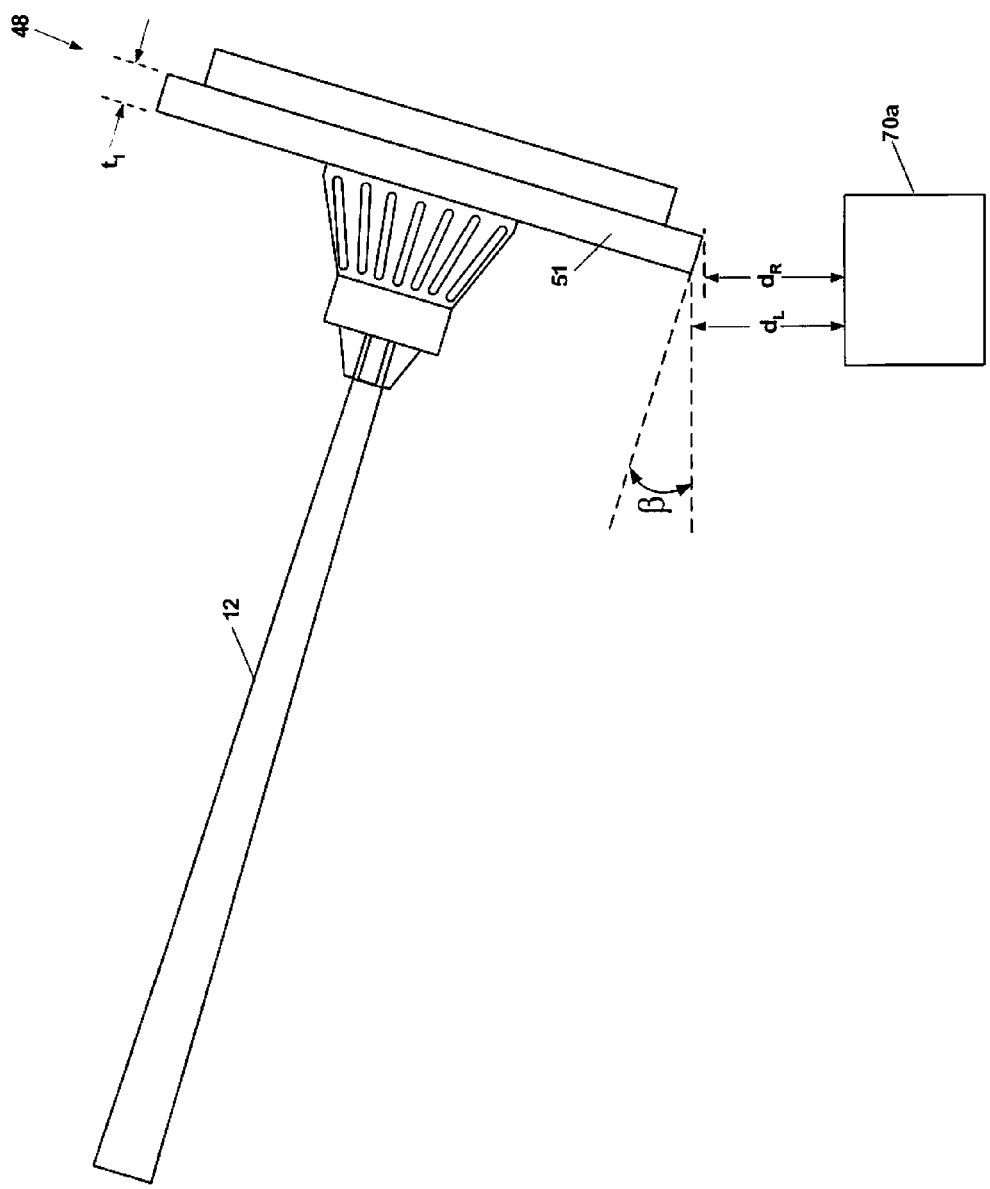
FIG. 20 depicts geometrical relationships considered in determining a shaft tip angle.

Another of the tests performed by the apparatus 10 is a test to determine the angle of the tip end 12b of the shaft with respect to horizontal when the tip mass assembly 48 is attached to the shaft 12 (step 208 of FIG. 21). This test is referred to herein as the "tip angle" test or "tip droop" test. As shown in FIG. 20, distances $d_L$ and $d_R$ are measured using one or both of the distance sensors 70a-70b as the slide stage 26 scans the beams from the distance sensors 70a-70b horizontally across the cylindrical surface 51 of the tip mass assembly 48. The tip angle β is then determined by the computer 90 according to:

$$\beta = \sin^{-1}\left(\frac{d_F - d_R}{t_1}\right).$$

This angular value is then displayed on the display device 92 and/or is printed on a hard-copy report sheet.

Another test performed by the apparatus 10 determines the straightness of the shaft 12 with respect to horizontal when the tip mass assembly 48 is attached to the shaft 12. The shaft straightness is also referred to herein as "run-out." With reference to FIGS. 10 and 17B, the distance $d_1$ (or $d_2$) is measured using the distance sensor 70a (or 70b) as the first electric motor 16 rotates the shaft 12 by at least 360 degrees about its center axis. The computer processor 90 records values of the measured distance $d_1$ (or $d_2$) at several rotational increments as the shaft 12 rotates, and calculates the x and y coordinates of the center of the shaft according to the process described above for each rotational increment. These shaft center locations are then plotted on the display device 92 and/or are printed on a hard-copy report sheet. FIG. 18 depicts an example of such a plot 256. For a perfectly straight shaft, the values will substantially overlay each other to form a small dot in the center of the polar plot. For a non-straight shaft, the values trace out a circle or ellipse, such as shown in the plot 256 in FIG. 18. Another valuable piece of information that may be derived from the plot 256 of FIG. 18 is the relative stiffness of the shaft. In a very stiff shaft, the tip end will exhibit little if any downward deflection relative to horizontal due to the weight of the tip mass assembly 48. Thus, for a very stiff shaft, the center of the circle or ellipse plotted in the run-out test will typically coincide with the horizontal centerline (y=0) of the grip end (first end) of the shaft which is secured in the clamping assembly 14. For a shaft of normal stiffness, the center of the circle or ellipse plotted in the run-out test will typically be slightly below the horizontal centerline. For a shaft of below-normal stiffness (a "soft" shaft), the center of the circle or ellipse plotted in the run-out test will be well below the horizontal centerline. As shown on the right side of the plot 256 in FIG. 18, the position of the center of the circle or ellipse can be related to a scale of relative stiffness, where a value of 1.0 indicates a very stiff shaft and lower numbers indicate lower stiffnesses.

As discussed above, one of the important shaft characteristics determined by the apparatus 10 is the rotational orientation of the PPOP. Although the apparatus 10 preferably generates a shaft test report document that includes this information, it is desirable to also mark a position relative to the PPOP directly on the shaft while the shaft is mounted in the apparatus 10. In a preferred embodiment, a line oriented parallel to the shaft axial centerline is marked on the shaft at a position that is offset from the PPOP position by 90 degrees. A club manufacturer can then use this line to orient the club face during assembly of the club. Ideally, the PPOP should be aligned with the swing plane of the club. Thus, the club head should be rotated to be substantially aligned with the line marked on the shaft.

Figure 23C:
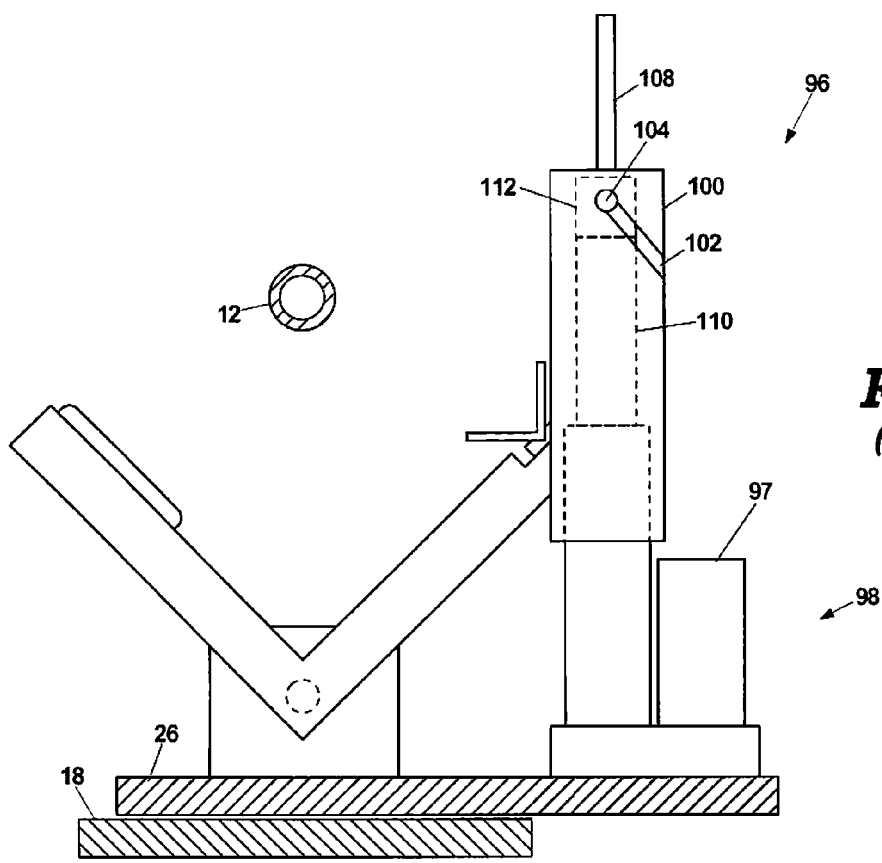
Figure 23D:
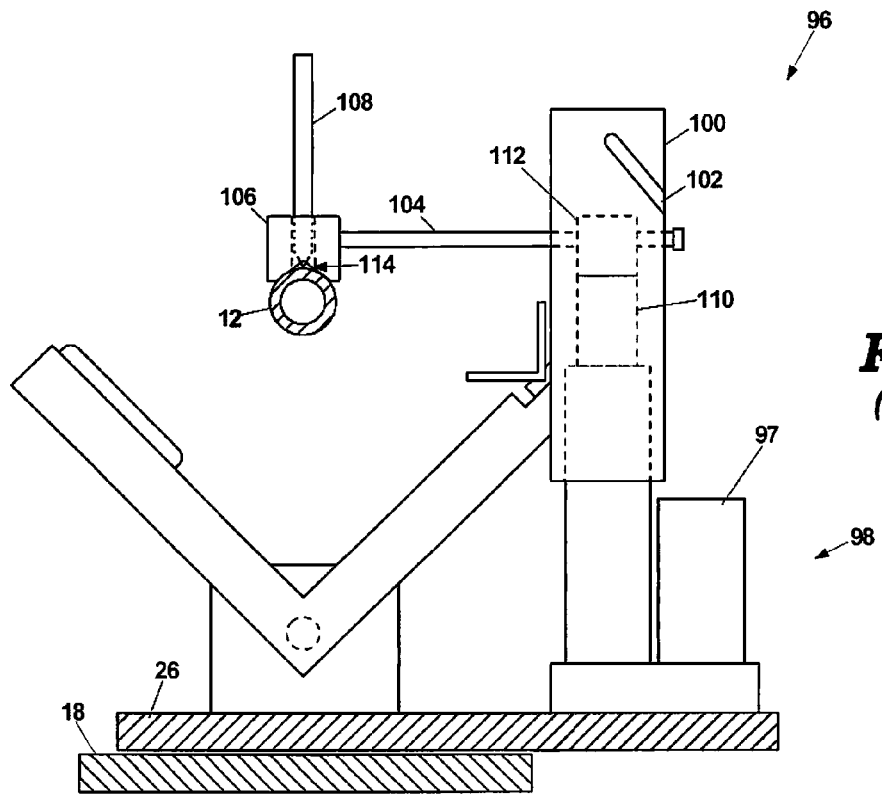

A preferred embodiment includes a line marking assembly 96 is shown in FIGS. 23A-23D for marking a line on the shaft 12 parallel to the shaft axial centerline. The line marking assembly 96 includes an actuator assembly 98 which controls vertical movement of an actuator rod 110 (FIG. 23D). The actuator assembly 98 comprises a computer-controllable actuator motor 97 which controls movement of an actuator rod 110. At the top of the actuator rod 110 is a pivoting connector member 112 having an aperture through which a first end of a shoulder bolt 104 is inserted and secured with a set screw. A pen holder 106 is secured to a second end of the shoulder bolt 104. The pen holder 106 has an aperture through which the tip end of a marker pen 108 is inserted and secured with a set screw. As shown in FIGS. 23A and 23D, the tip of the marker pen 108 extends just below a V-shaped recess 114 which extends along the bottom surface of the pen holder 106.

The line marking assembly 96 includes a guide tube 100 secured to the actuator assembly 98. In a preferred embodiment, the guide tube 100 is a cylinder having an inner diameter large enough to accommodate free movement of the actuator rod 110 therein. A pair of guide slots 102 are provided through the side wall of the guide tube 100 on opposite sides thereof. In the preferred embodiment, opposing ends of the shoulder bolt 104 extend through these guide slots 102 on either side of the guide tube 102. As the actuator motor 97 is activated to vertically move the actuator rod 110, the shoulder bolt 104 slides through and is guided by the guide slots 102. In this way, the shoulder bolt 104 swings horizontally through an angle of about 90 degrees as it moves from the position shown in FIGS. 23A and 23C where the pen holder is disengaged from the shaft to the position shown in FIGS. 23B and 23D where the pen holder is engaged with the shaft. As the shoulder bolt 104 swings around and down, the V-shaped recess 114 of the pen holder 106 engages and presses down slightly on the shaft 12. As shown in FIG. 23D, the tip of the marker pen 108 is then in position to mark a line on the shaft 12. With the tip of the marker pen 108 touching the shaft as shown in FIGS. 23B and 23D, the slide positioning stage 26 is moved horizontally in either or both of the directions indicated by the arrow 116 to mark a line on the shaft. Preferably, the length of the line is about 2 inches.

As shown in FIG. 16, the actuator motor 97 of the actuator assembly 98 is connected to the data acquisition and control interface 94 and is controlled by the computer 90. Thus, the activation of the actuator assembly 98 to move the marker pen 108 into position and the activation of the slide positioning stage 26 to mark the line on the shaft 12 are controlled by signals from the computer 90 based on the execution of control software.

It will be appreciated that the line marking assembly 96 could be oriented in various different ways relative to the shaft 12, such that the marker pen 108 could engage the shaft 12 from the top (as shown in FIGS. 23B and 23D), from the bottom or from either side. Thus, the invention is not limited to any particular orientation of the line marking assembly 96 relative to the shaft 12.

In describing the various embodiments of the invention herein, the shaft being measured is a golf club shaft. However, those skilled in the art will appreciate that the apparatus and methods described herein are applicable to the automated measurement of physical characteristics of various other types of shafts, such as pool cues, archery arrows, fishing rods and javelins, just to name a few examples. Thus, the various embodiments of the invention described and claimed herein are not limited to measurements associated with golf club shafts.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for measuring physical characteristics of a shaft having a first end, a second end, and a shaft center axis extending from the first end to the second end, the method comprising:
   (a) securing the first end of the shaft to prevent movement thereof;
   (b) attaching a tip mass structure to the second end of the shaft, the tip mass structure having a reflective outer surface with a known curvature;
   (c) imparting oscillatory motion in the shaft, thereby causing the tip mass structure to oscillate in one or more directions substantially perpendicular to the shaft center axis;
   (d) illuminating the reflective outer surface of the tip mass structure with at least two spaced apart laser beams as the tip mass structure oscillates;
   (e) detecting laser energy reflected from the reflective outer surface of the tip mass structure as the tip mass structure oscillates;
   (f) generating shaft distance signals based upon the laser energy detected in step (e); and
   (g) based on the shaft distance signals and the known curvature of the reflective outer surface of the tip mass structure, determining information about the oscillatory motion of the second end of the shaft.

2. The method of claim 1 further comprising executing instructions in a computer processor to generate control signals to control one or more of the steps of the method.

3. The method of claim 1 wherein step (g) further comprises determining information indicative of a principal planar oscillation plane of the shaft.

4. The method of claim 1 wherein step (g) further comprises determining information indicative of a frequency of oscillation of the shaft.

5. The method of claim 1 further comprising, prior to step (c), moving one or more sources of the laser beams in a direction substantially parallel to the shaft center axis to a desired position at which the laser beams are incident upon the reflective outer surface of the tip mass structure, and determining arrival at the desired position based on the laser energy reflected from the reflective outer surface of the tip mass structure.

6. The method of claim 1 further comprising determining a tip angle of the shaft relative to horizontal based at least in part on laser energy reflected from the reflective outer surface of the tip mass structure.

7. The method of claim 1 further comprising incrementally rotating the shaft about its shaft center axis to one or more rotation positions and performing steps (c) through (g) at each rotation position.

8. The method of claim 7 wherein incremental rotation of the shaft is performed by an electric motor under computer control, and wherein rotational angle information is provided by the motor.

9. The method of claim 1 further comprising:
   (h) moving a torque sensor assembly toward the tip mass structure in a direction substantially parallel to the shaft center axis;

(i) engaging the torque sensor assembly with the tip mass structure to substantially prevent rotation of the second end of the shaft;

(j) rotating the first end of the shaft through a rotation angle until the torque sensor assembly senses a predetermined torque value; and (k) determining the rotation angle at which the torque sensor assembly senses the predetermined torque value.

10. The method of claim 9 wherein proper engagement of the torque sensor assembly with the tip mass structure is determined based on the laser energy reflected from the tip mass structure as the torque sensor assembly is moved toward the tip mass structure.

11. The method of claim 9 further comprising executing instructions in a computer processor to generate control signals to control at least steps (h), (j) and (k).

12. The method of claim 1 wherein step (a) comprises:

(a1) inserting the first end of the shaft into a first clamping assembly;

(a2) resting the shaft on a cradle structure disposed between the first end and the second end of the shaft;

(a3) engaging a tip-centering structure with the second end of the shaft by moving the tip-centering structure toward the second end of the shaft;

(a4) urging the first end of the shaft against the first clamping assembly while performing step (a3);

(a5) engaging a chuck teeth restraining device into chuck teeth of the first clamping assembly;

(a6) rotating the first clamping assembly while performing step (a5) to tighten the first clamping assembly on the first end of the shaft.

13. The method of claim 12 wherein steps (a3) through (a6) are performed using electric motors under computer control, the method further comprising executing instructions in a computer processor to generate control signals to control at least steps (a2) through (a6) of the method.

14. The method of claim 1 further comprising:

(h) pressing a load sensor against the shaft whereby the shaft is flexed to a bent position;

(i) rotating the shaft about the shaft center axis while performing step (h);

(j) generating a load signal using the load sensor while performing steps (h) and (i);

(k) generating a rotation angle signal while performing steps (h) and (i); and (l) determining information indicative of stiffness asymmetry of the shaft based on the load signal and rotation angle signal.

15. The method of claim 14 wherein rotation of the shaft is performed by an electric motor under computer control, and wherein the rotation angle signal is provided by the motor.

16. The method of claim 1 wherein the shaft comprises a golf club shaft, the first end of the shaft comprises a grip end of the golf club shaft, and the second end of the shaft comprises a tip end of the golf club shaft.

17. The method of claim 1 wherein the reflective outer surface is cylindrical and has a radius R.

18. The method of claim 17 wherein the at least two spaced apart laser beams comprise first and second parallel laser beams, and step (g) includes calculating the position of the center of the shaft according to:

$$x = \sqrt{R^2 - \left(\frac{\sqrt{(d_2-d_1)^2 + S^2}}{2}\right)^2} \times \frac{d_2 - d_1}{\sqrt{(d_2-d_1)^2 + S^2}}$$

$$y = \sqrt{R^2 - \left(\frac{S}{2} - x\right)^2} - \sqrt{R^2 - \left(\frac{S}{2}\right)^2} + d_2 - d_{2INIT},$$

where x is an x-position of the center of the shaft, y is a y-position of the center of the shaft, S is a distance separating the first and second laser beams, $d_1$ is a distance between the reflective outer surface and a source of the first laser beam, $d_2$ is a distance between the reflective outer surface and a source of the second laser beam, $d_{2INIT}$ is an initial distance between the reflective outer surface and a source of the second laser beam when the reflective outer surface is in an initial position.

19. The method of claim 1 wherein the shaft comprises an elongated structure selected from the group consisting of a golf club shaft, a fishing pole, a pool cue, an archery arrow, a javelin and a baseball bat.

20. An apparatus for measuring physical characteristics of a shaft having a first end, a second end, and a shaft center axis extending from the first end to the second end, the apparatus comprising:

a first clamping assembly for securing the first end of the shaft to prevent movement thereof;

a first computer-controlled motor for imparting rotation to the first clamping assembly, thereby causing the shaft to rotate about the shaft center axis;

a tip mass assembly comprising:

a second clamping assembly operable for attachment to the second end of the shaft; and a tip mass structure attached to the second clamping assembly, the tip mass structure having a reflective outer surface, whereby a central axis of the reflective outer surface substantially coincides with the shaft center axis when the second clamping assembly is attached to the second end of the shaft;

an oscillation inducement arm for pressing against the shaft to flex the shaft to a bent position, and for subsequently disengaging rapidly from the shaft to allow the second end of the shaft to spring back freely, thereby imparting an oscillatory motion in the shaft which causes the tip mass structure to oscillate in a direction substantially perpendicular to the shaft center axis;

a second computer-controlled motor for imparting rotation to the oscillation inducement arm to cause the oscillation inducement arm to press against and subsequently disengage from the shaft;

at least one laser light source for generating at least two spaced apart laser beams that illuminate the reflective outer surface of the tip mass structure;

at least two laser light detectors for detecting laser energy reflected from the reflective outer surface of the tip mass structure as the tip mass structure oscillates due to motion induced by the oscillation inducement arm, the laser light detectors for generating shaft distance signals based on the detected laser energy; and a computer processor for processing the shaft distance signals to determine information about the oscillatory motion of the second end of the shaft.

21. The apparatus of claim 20 wherein the computer processor processes the shaft distance signals to determine information indicative of a principal planar oscillation plane of the second end of the shaft.

22. The apparatus of claim 20 wherein the computer processor processes the shaft distance signals to determine information indicative of a frequency of oscillation of the second end of the shaft.

23. The apparatus of claim 20 further comprising:
the first clamping assembly including a first chuck having first chuck teeth;
a tip-centering structure disposed adjacent the second end of the shaft when the first end of the shaft is inserted into the first clamping assembly, the tip-centering structure attached to a first computer-controlled slide positioning stage;
the first computer-controlled slide positioning stage for moving the tip-centering structure toward the first clamping assembly in a direction substantially parallel to the shaft center axis, thereby engaging the tip-centering structure with the second end of the shaft to horizontally and vertically center the second end of the shaft as the shaft is urged toward the first clamping assembly, and urging the first end of the shaft against the first clamping assembly;
a chuck teeth restraining device disposed adjacent the chuck teeth of the first chuck of the first clamping assembly, the chuck teeth restraining device attached to a second computer-controlled slide positioning stage;
the second computer-controlled slide positioning stage for moving the chuck teeth restraining device toward the first clamping assembly in a direction substantially parallel to the shaft center axis, thereby engaging the chuck teeth restraining device with the chuck teeth to hold the chuck teeth stationary; and
the first computer-controlled motor for imparting rotation to the first clamping assembly, thereby causing the first chuck to tighten onto the first end of the shaft as the chuck teeth are held stationary by the chuck teeth restraining device.

24. The apparatus of claim 20 further comprising:
a slide positioning stage for moving the at least one laser light source in a direction substantially parallel to the shaft center axis to a desired position at which the laser beams are incident upon the reflective outer surface of the tip mass structure; and
the computer processor for determining arrival at the desired position based on the laser energy reflected from the reflective outer surface of the tip mass structure.

25. The apparatus of claim 20 wherein the computer processor determines an angle of droop of the second end of the shaft relative to horizontal based at least in part on laser energy reflected from the reflective outer surface of the tip mass structure.

26. The apparatus of claim 20 further comprising:
a slide positioning stage operable to move in a direction substantially parallel to the shaft center axis;
a torque sensor assembly mounted on the slide positioning stage, the torque sensor assembly operable to engage the tip mass structure when moved into a desired position by the slide positioning stage, the torque sensor assembly substantially preventing rotation of the second end of the shaft when engaged with the tip mass structure;
the first computer-controlled motor for rotating the first end of the shaft through a known rotational angle until the torque sensor assembly generates a torque signal corresponding to a predetermined torque value.

27. The apparatus of claim 20 wherein proper engagement of the torque sensor assembly with the tip mass structure at the desired position is determined based on the laser energy reflected from the tip mass structure as the torque sensor assembly is moved toward the tip mass structure.

28. The apparatus of claim 20 further comprising:
a load sensor arm having a first end and a second end, with the second end attached to the oscillation inducement arm such that the load sensor arm and the oscillation inducement arm form a substantially V-shaped configuration, whereby the second computer-controlled motor imparts rotation simultaneously to the load sensor arm and the oscillation inducement arm;
a load sensor mounted on the first end of the load sensor arm, the load sensor for generating a load signal when pressed against the shaft;
the second computer-controlled motor for rotating the load sensor arm to press the load sensor against the shaft whereby the shaft is flexed to a bent position;
the first computer-controlled motor for rotating the shaft about the shaft center axis and generating a rotation angle signal while the load sensor is pressed against the shaft; and
the computer processor for determining information indicative of stiffness asymmetry of the shaft based on the load signal and rotation angle signal.

29. The apparatus of claim 20 further comprising:
a third computer-controlled motor attached to the first clamping assembly for rotating the first collet to secure the first end of the shaft therein; and
the computer processor for controlling the third computer-controlled motor to rotate the first clamping assembly when the first end of the shaft is in a desired position with respect to the first clamping assembly.

30. The apparatus of claim 20 wherein the first clamping assembly comprises a chuck and collet assembly.

31. The apparatus of claim 20 wherein the shaft comprises a golf club shaft, the first end of the shaft comprises a grip end of the golf club shaft, and the second end of the shaft comprises a tip end of the golf club shaft.

32. The apparatus of claim 20 wherein the at least one laser light source and the at least one laser light detector are components of first and second laser distance sensors which generate the at least two spaced apart laser beams, wherein the at least two spaced apart laser beams comprise first and second parallel laser beams originating from the first and second laser distance sensors, and wherein the computer processor calculates the position of the center of the shaft according to:

$$x = \sqrt{R^2 - \left(\frac{\sqrt{(d_2 - d_1)^2 + S^2}}{2}\right)^2} \times \frac{d_2 - d_1}{\sqrt{(d_2 - d_1)^2 + S^2}}$$

$$y = \sqrt{R^2 - \left(\frac{S}{2} - x\right)^2} - \sqrt{R^2 - \left(\frac{S}{2}\right)^2} + d_2 - d_{2INIT},$$

where x is an x-position of the center of the shaft, y is a y-position of the center of the shaft, R is a radius of the reflective outer surface of the tip mass structure, S is a distance separating the first and second laser beams, $d_1$ is a distance between the reflective outer surface of the tip mass structure and the first laser distance sensor, $d_2$ is a distance between the reflective outer surface and the second laser distance sensor, $d_{2INIT}$ is an initial distance between the reflective outer surface and the second laser distance sensor when the reflective outer surface is in an initial position.

33. The apparatus of claim 20 wherein the shaft comprises an elongated structure selected from the group consisting of a golf club shaft, a fishing pole, a pool cue, an archery arrow, a javelin and a baseball bat.

34. An apparatus for measuring physical characteristics of a shaft having a first end, a second end, and a shaft center axis extending from the first end to the second end, the apparatus comprising:
- a first clamping assembly for securing the first end of the shaft;
- a load sensor arm disposed adjacent the second end of the shaft, the load sensor arm having a first end and a second end;
- a load sensor mounted on the first end of the load sensor arm, the load sensor for generating a load signal when pressed against the shaft;
- a second computer-controlled motor attached to the second end of the load sensor arm, the second computer-controlled motor for rotating the load sensor arm to press the load sensor against the shaft whereby the shaft is flexed to a bent position;
- a first computer-controlled motor for imparting rotation to the first clamping assembly, thereby causing the shaft to rotate about the shaft center axis, and the first computer-controlled motor for generating a rotation angle signal as the shaft is rotated; and
- the computer processor for determining information indicative of stiffness asymmetry of the shaft based on the load signal and rotation angle signal.

35. An apparatus for measuring physical characteristics of a shaft having a first end, a second end, and a shaft center axis extending from the first end to the second end, the apparatus comprising:
- a first clamping assembly for securing the first end of the shaft;
- a tip mass structure securely attached to the second end of the shaft;
- a first computer-controlled motor for imparting rotation to the first clamping assembly, thereby causing the shaft to rotate about the shaft center axis, and the first computer-controlled motor for generating a rotation angle signal as the shaft is rotated;
- a slide positioning stage operable to move in a direction substantially parallel to the shaft center axis;
- a torque sensor assembly mounted on the slide positioning stage, the torque sensor assembly operable to engage the tip mass structure when moved into a desired position by the slide positioning stage, the torque sensor assembly substantially preventing rotation of the second end of the shaft when engaged with the tip mass structure;
- the first computer-controlled motor for rotating the first end of the shaft through a rotational angle until the torque sensor assembly generates a torque signal corresponding to a predetermined torque value; and
- a computer processor for determining information indicative of torsional stiffness of the shaft based on the predetermined torque value and the rotation angle signal.

36. An apparatus for measuring physical characteristics of a structural member having a first end, a second end, and a structural member center axis extending from the first end to the second end, the apparatus comprising:
- a first clamping assembly for securing the first end of the structural member;
- a slide positioning stage operable to move in a first direction substantially parallel to the structural member center axis;
- a line marking assembly disposed on the slide positioning stage, the line marking assembly comprising:
  - a guide tube having a guide tube center axis aligned in a second direction substantially perpendicular to the first direction, the guide tube having at least one guide slot extending through a side wall of the guide tube;
  - an actuator assembly comprising:
    - an actuator rod disposed at least partially within the guide tube, the actuator rod operable to move in the second direction and having a rod center axis which is substantially parallel with the guide tube center axis, the actuator rod having a connector member operable to rotate about the rod center axis; and
    - a computer-controllable actuator motor for imparting movement to the actuator rod in the second direction;
  - a shoulder bolt having a first end attached to the connector member of the actuator rod and a second end opposite the first end, the shoulder bolt extending from the actuator rod and through the at least one guide slot,
  - a pen holder attached to the second end of the shoulder bolt, the pen holder having a recess for engaging the structural member; and
  - a marker pen attached to the pen holder, the marker pen having a tip which is operable to touch the structural member when the structural member is engaged with the recess of the pen holder,
  - wherein as the computer-controllable actuator motor moves the actuator rod in the second direction, the shoulder bolt swings through a rotation path which is determined by the at least one guide slot in the guide tube, the rotation path including a position at which the pen holder is disengaged from the structural member and a position at which the pen holder is engaged with the structural member,
- wherein as the pen holder is engaged with the structural member so that the tip of the marker pen is touching the structural member, the slide positioning stage is operable to move in the first direction thereby causing the tip of the marker pen to move in the first direction along the structural member and thereby marking on the structural member a line which is substantially parallel to the structural member center axis.

37. The apparatus of claim 36 wherein the line provides a reference position on the structural member that may be used in an assembly process for the structural member.

38. The apparatus of claim 36 wherein the structural member comprises an elongated structure selected from the group consisting of a golf club shaft, a fishing pole, a pool cue, an archery arrow, a javelin and a baseball bat.

* * * * *